US009267486B2

(12) United States Patent
Cleeves et al.

(10) Patent No.: US 9,267,486 B2
(45) Date of Patent: Feb. 23, 2016

(54) MULTI-MODE HIGH EFFICIENCY INTERNAL COMBUSTION ENGINE

(75) Inventors: James M. Cleeves, Redwood City, CA (US); Michael A. Willcox, Redwood City, CA (US); Simon David Jackson, Redwood City, CA (US); Nicholas Manov, Palo Alto, CA (US)

(73) Assignee: Pinnacle Engines, Inc., San Carlos, CA (US)

( * ) Notice: Subject to any disclaimer, the term of this patent is extended or adjusted under 35 U.S.C. 154(b) by 418 days.

(21) Appl. No.: 13/344,515

(22) Filed: Jan. 5, 2012

(65) Prior Publication Data
US 2012/0158273 A1 Jun. 21, 2012

Related U.S. Application Data

(63) Continuation-in-part of application No. 12/720,457, filed on Mar. 9, 2010, now Pat. No. 8,544,445.

(51) Int. Cl.
*F02D 41/30* (2006.01)
*F02P 5/15* (2006.01)
*F01L 1/18* (2006.01)
(Continued)

(52) U.S. Cl.
CPC ............... *F02P 5/1502* (2013.01); *F01L 1/182* (2013.01); *F01L 3/18* (2013.01); *F02B 25/08* (2013.01); *F02B 31/02* (2013.01); *F02B 75/282* (2013.01); *F02D 15/00* (2013.01); *F02D 41/3017* (2013.01); *F01L 2001/054* (2013.01);
(Continued)

(58) Field of Classification Search
CPC .......................... F02D 41/30; F02D 41/3017

USPC ............................ 701/105; 123/294, 295, 301
See application file for complete search history.

(56) References Cited

U.S. PATENT DOCUMENTS 4,165,720 A  8/1979 Barcak
4,169,436 A  10/1979 Welch et al.
(Continued)

FOREIGN PATENT DOCUMENTS

DE  103 50 798 A1  5/2011
JP  H11-159382 A  6/1999
(Continued)

OTHER PUBLICATIONS

PCT International Search Report dated Jul. 6, 2011 for corresponding PCT Application No. PCT/US2011/027775.
(Continued)

*Primary Examiner* — Erick Solis
(74) *Attorney, Agent, or Firm* — Mintz Levin Cohn Ferris Glovsky and Popeo, P.C.

(57) ABSTRACT

An internal combustion engine is operable in an efficiency mode providing a first power output range between zero and a transition power output and in a power mode providing a second power output range between the transition power output and a maximum power output. The efficiency mode can include a first ignition timing and a first air/fuel ratio of the mixture to avoid premature auto-ignition, and the power mode can include a second ignition timing and a second air/fuel ratio of the mixture to avoid premature auto-ignition of the mixture. To further enable knock free operation of such an engine, turbulence can be imparted to the mixture to promote a faster burn duration and high temperatures that may lead to premature auto-ignition of the mixture can be avoided.

20 Claims, 12 Drawing Sheets

(51) Int. Cl.
  *F01L 3/18* (2006.01)
  *F02B 25/08* (2006.01)
  *F02B 31/02* (2006.01)
  *F02B 75/28* (2006.01)
  *F02D 15/00* (2006.01)
  *F01L 1/047* (2006.01)
  *F02D 41/00* (2006.01)

(52) U.S. Cl.
  CPC ......... *F02D2041/0015* (2013.01); *Y02T 10/12* (2013.01); *Y02T 10/146* (2013.01); *Y02T 10/46* (2013.01)

(56) References Cited

U.S. PATENT DOCUMENTS

| | | |
|---|---|---|
| 4,440,116 A | 4/1984 | Stevenson et al. |
| 4,491,117 A | 1/1985 | Koide |
| 5,878,714 A | 3/1999 | Dai et al. |
| 6,067,954 A | 5/2000 | Kudou et al. |
| 6,125,801 A | 10/2000 | Mendler |
| 7,128,062 B2 | 10/2006 | Kuo et al. |
| 7,314,037 B2 | 1/2008 | Roithinger |
| 7,343,902 B2 * | 3/2008 | Brevick et al. ............... 123/481 |
| 7,658,183 B1 | 2/2010 | Johnson |
| 7,954,471 B2 * | 6/2011 | Nishimoto et al. ........... 123/261 |
| 2001/0017123 A1 | 8/2001 | Raab et al. |
| 2002/0007816 A1 | 1/2002 | Zur Loye et al. |
| 2004/0103860 A1 | 6/2004 | zur Loye et al. |
| 2004/0149255 A1 | 8/2004 | zur Loye et al. |
| 2005/0016496 A1 | 1/2005 | Hitomi et al. |
| 2006/0225693 A1 | 10/2006 | Brachert et al. |
| 2007/0193545 A1 * | 8/2007 | Brevick et al. ............. 123/179.5 |
| 2007/0227503 A1 | 10/2007 | Hitomi et al. |
| 2008/0000445 A1 | 1/2008 | Kim et al. |
| 2008/0208435 A1 | 8/2008 | Bryant |
| 2009/0048756 A1 * | 2/2009 | Park et al. ..................... 701/101 |
| 2009/0159045 A1 | 6/2009 | Hitomi et al. |
| 2009/0173319 A1 | 7/2009 | Koch |
| 2010/0206251 A1 | 8/2010 | Poeschl et al. |
| 2011/0011061 A1 | 1/2011 | Yamakawa et al. |

FOREIGN PATENT DOCUMENTS

| | | |
|---|---|---|
| JP | 2003-214169 A | 7/2003 |
| JP | 2007-032530 A | 2/2007 |
| JP | 2007-292060 A | 11/2007 |
| JP | 2007-332832 A | 12/2007 |

OTHER PUBLICATIONS

Japanese Patent Office Action issued in JP Patent Application No. 2012-557223, dated Dec. 2, 2014.

* cited by examiner

Section B-B

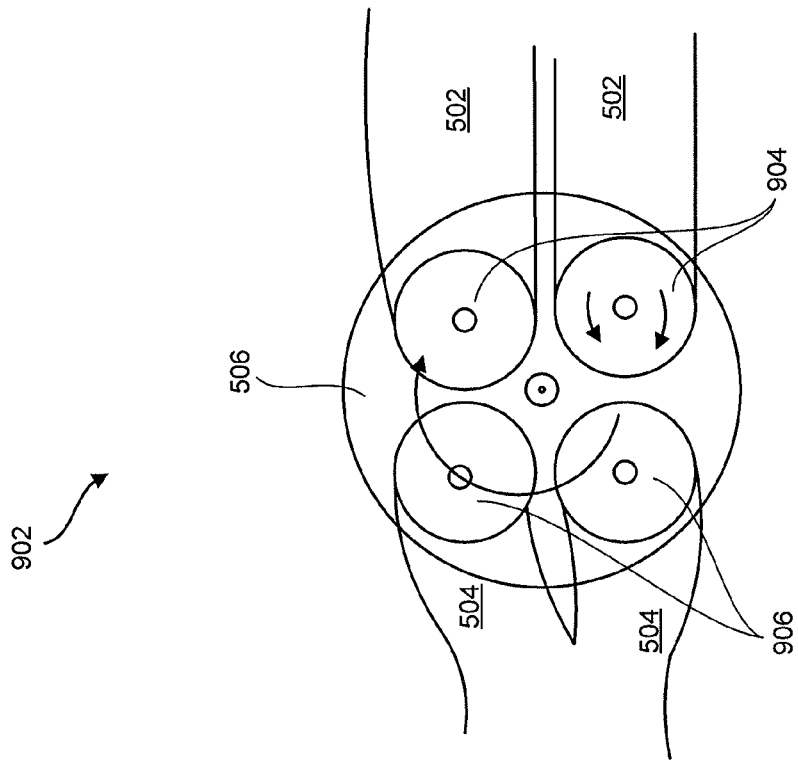
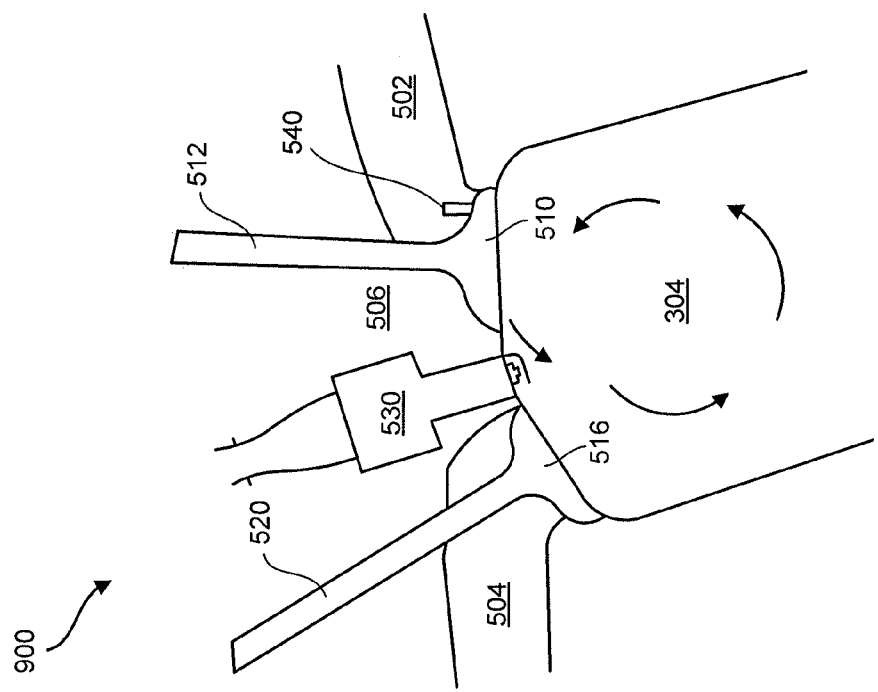

MULTI-MODE HIGH EFFICIENCY INTERNAL COMBUSTION ENGINE

RELATED APPLICATIONS

This application claims priority under 35 U.S.C. §120 to co-pending and co-owned U.S. patent application Ser. No. 12/720,457 filed on Mar. 9, 2010 and to co-pending and co-owned International Patent Application No. PCT/US2011/027775 filed on Mar. 9, 2011. The disclosure of each application listed in this paragraph is incorporated herein by reference in its entirety.

TECHNICAL FIELD

The subject matter described herein relates to internal combustion engines, and in particular, to internal combustion engines being operable at an elevated compression ratio while also being knock resistant.

BACKGROUND

Internal combustion engines are commonly used to provide power for motor vehicles as well as in other applications, such as for example for lawn mowers and other agricultural and landscaping equipment, power generators, pump motors, boats, planes, and the like. For a typical driving cycle of a motor vehicle, the majority of fuel consumption may occur during low-load and idling operation of the vehicle's internal combustion engine. Similarly, other uses of internal combustion engine may also be characterized by more frequent use at a power output less than that provided at a wide open throttle condition. However, due to mechanical friction, heat transfer, throttling, and other factors that can negatively impact performance, spark ignition internal combustion engines inherently have better efficiency at high loads and poorer efficiency at low loads.

Efficiency at lower engine loads can be improved in some instance by increasing a compression ratio of the engine. The compression ratio is a measure of the degree to which an air-fuel mixture is compressed before, ignition that is defined as the expanded volume of the engine combustion chamber divided by the compressed volume of the engine combustion chamber. A high compression ratio in a standard Otto cycle engine generally results in the piston performing a longer expansion in the power stroke, and consequently more work, in comparison to the same engine running at a lower compression ratio. Compression ratios of gasoline powered automobiles using gasoline with an octane rating of 87 typically range between about 8.5:1 and 10:1.

The maximum compression ratio achievable by an engine can be limited by uncontrolled advanced (i.e. prior to an intended timing) ignition of the air-fuel mixture at high temperatures, a problem commonly referred to as engine knock. Knock can occur as a result of disassociation of the fuel into more easily combustible molecular fragments when the mixture is exposed to high temperatures for a sufficiently long period of time. The high temperature exposure can result in these fragments initiating an uncontrolled explosion outside the envelope of the normal combustion. For example, auto-ignition typically occurs prior to the piston reaching the top dead center (TDC) position of a compression stroke, so in some cases knock can occur before the piston passes TDC to start the expansion stroke. Auto-ignition can also occur on the expansion stroke as the end gas is heated and compressed by the already burned mixture so that pockets of the combustion mixture ignite outside of the normal combustion envelope. Engine knock causes audible and potentially damaging pressure waves inside combustion chamber. Knock is a specific problem associated with the more general issue of auto-ignition. In this document, auto-ignition refers to instances in which the ignition occurs independently of when the spark is fired, as in homogeneous ignition or a burn initiated by a surface ignition prior to the spark event.

A variety of factors in addition to high compression ratios can affect the occurrence of knock in particular and auto-ignition in general. In general, low octane gasoline may spontaneously ignite at lower temperatures than high octane gasoline. Hot wall or piston temperatures in engines can also tend to increase the heating of the air-fuel mixture, thereby increasing a tendency of the fuel to auto-ignite, as can localized hot spots, such as around the exhaust valve, which may cause localized heating of the air-fuel mixture and knocking in the area of the hot spots. A fast burn rate of the fuel-air mixture, for example due to high turbulence, which promotes good mixing and rapid burning of the fuel, can reduce the likelihood of spontaneous ignition. However, high inlet flow field turbulence can also increase the temperature rise in the inlet air-fuel mixture, which increases the likelihood of spontaneous ignition. Increasing the quantity of fuel in the mixture up to stoichiometric can increase the energy released and hence the pressure and temperature of the end gas, which can affect the tendency to knock. Advanced ignition timing can also generate high peak pressures and temperatures, thereby contributing to a tendency for auto-ignition under some conditions.

Many conventional internal combustion engines are typically configured for a four-stroke Otto cycle, an idealized version of which is illustrated by the chart 40 of FIG. 1A. As shown, the four-stroke Otto cycle includes an air/fuel inlet stage 50, an isentropic compression stage 52, a constant volume combustion stage 54, an isentropic expansion stage 56, a blowdown stage 58, and an exhaust stage 60. The piston compresses the mixture during the compression stage 52 to the same degree that it expands during the power stage 56. The Otto cycle is generally characterized as having its best efficiency at high loads with substantially reduced efficiency at lower loads (e.g. while operating a throttled condition). Pumping loses against the throttle can also be significant. The symmetry of an Otto cycle can also lead to limited efficiency. In an Otto cycle engine, a throttle is typically used to limit the airflow for part-load operation. The throttle restricts the airflow into the manifold so that the engine pulls in air from this reduced pressure region. So the work to pump the air into the engine is typically higher than if the valves had been used to limit the airflow.

In contrast, the Atkinson cycle can provide a higher efficiency than the Otto cycle by utilizing an asymmetric cycle that reduces pumping work. When an engine is operated in an Atkinson cycle, the effective air/fuel compression stroke is shortened relative to the power expansion stroke. This may be accomplished, for example, by keeping the inlet valve closed for a portion of the air/fuel inlet stroke, thus reducing the mass of the air-fuel mixture admitted for the compression stroke. The geometric compression ratio is such that this limited amount of charge is compressed near the limits imposed by the octane rating of the fuel. The compressed mixture is then ignited and expanded through a expansion stroke that is longer than the compression stroke. The chart 61 of FIG. 1B illustrates a first idealized version of the Atkinson cycle. In this example of an early intake valve closing Atkinson cycle, the air-fuel mixture may be drawn in at stage 62 without a change in pressure until a volume $V_0$ of mixture is admitted. At that point, the inlet valve is closed and a second part 64 of the inlet stroke continues with no more mixture being admitted. The pressure in the chamber drops during the second part 64 of the inlet stroke at this point because the volume continues to expand with no additional air being added, The mixture is compressed during an adiabatic stage 66, combusted at constant volume in a combustion stage 68, and adiabatically expanded in a power stage 70. The exhaust gases are withdrawn in an exhaust stage 74 following a blowdown stage 72. The chart 80 of FIG. 1C illustrates a second idealized version of the Atkinson cycle. In this example of a late intake valve closing Atkinson cycle, the inlet valve is left open throughout the inlet stroke 82 and also through the first part 84 of the compression stroke until the inlet valve is closed. The volume of mixture $V_0$ remaining in the combustion chamber after the closing of the inlet valve is compressed during an adiabatic stage 86, combusted at constant volume in a combustion stage 88, and adiabatically expanded in a power stage 90. The exhaust gases are withdrawn in an exhaust stage 94 following a blowdown stage 92. Thus, in an Atkinson cycle, the expansion stages 70 and 90 is increased relative to the compression stages 66 and 86. The Atkinson cycle increases efficiencies at lower loads by extracting more work out of an expansion stroke for a given compression ratio.

The Atkinson cycle is generally unable to provide high power densities for high load engine operation. Because of power density limitations, however, the Atkinson cycle in conventional engines is usually used only for low loads. Variable valve timing and variable compression ratio can be used to make an engine operate in the Atkinson mode at low power and in the Otto cycle, or symmetric mode, for high power. One approach to achieve this type of operation is a late inlet valve closing (LIVC) strategy, such as for example that shown in FIG. 1C and discussed above.

SUMMARY

In one aspect, a method includes delivering a fluid that includes inlet air to a combustion volume of an internal combustion engine in a manner that imparts sufficient motion to the fluid to generate at least a threshold amount of turbulence within the combustion volume, which is defined by at least a cylinder wall and a piston. Internal surfaces within the combustion volume that come into contact with a mixture of the inlet air and a fuel prior to completion of a burn of the mixture are maintained at or below a second target temperature. The internal combustion engine is operated in an efficiency mode to provide a first power output range between zero and a transition power output level and in a power mode to provide a second power output range between the transition power output level and a maximum power output level. The efficiency mode includes use of a first ignition timing and a first air/fuel ratio of the mixture that are selected to avoid premature auto-ignition of the mixture in the efficiency mode according to an octane rating of the fuel and a compression ratio exceeding approximately 13:1. The power mode includes use of a second ignition timing and a second air/fuel ratio of the mixture that are selected to avoid premature auto-ignition of the mixture in the power mode according to the octane rating of the fuel and the compression ratio exceeding approximately 13:1.

In a second interrelated aspect, an internal combustion engine includes an inlet port that delivers a fluid that includes inlet air to a combustion volume. The fluid is delivered with an imparted amount of motion that is sufficient to generate at least a threshold amount of turbulence within the combustion volume. One or more internal surfaces of the combustion chamber are maintained at or below a second target temperature. The one or more internal surfaces include a cylinder wall of a cylinder, a piston in the cylinder, and at least one valve associated with the inlet port or an exhaust port. One or more control devices are include to cause the internal combustion engine to be operated in at least one of an efficiency mode to provide a first power output range between zero and a transition power output level and a power mode to provide a second power output range between the transition power output level and a maximum power output level. The efficiency mode includes use of a first ignition timing and a first air/fuel ratio of the mixture that are selected to avoid premature auto-ignition of the mixture in the efficiency mode according to an octane rating of the fuel and a compression ratio exceeding approximately 13:1. The power mode includes use of a second ignition timing and a second air/fuel ratio of the mixture that are selected to avoid premature auto-ignition of the mixture in the power mode according to the octane rating of the fuel and the compression ratio exceeding approximately 13:1.

In some variations one or more of the following features can optionally be included in any feasible combination. The first air/fuel ratio and the second air/fuel ratio, which can be the ratio ($\lambda_1$ and $\lambda_2$, respectively) of the actual air/fuel ratio relative to the air/fuel ratio that provides a stoichiometric ratio for the fuel being burned, can both be approximately 1. Alternatively, the first air/fuel ratio ($\lambda$) can be progressively reduced from greater than approximately 1.3 as the transition power output level is approached, and the second air/fuel ratio ($\lambda_2$) can be approximately 1. The first ignition timing can be at approximately maximum brake torque and the second ignition timing can be gradually retarded to progressively later than maximum brake torque as the maximum power output is approached. Alternatively, the first ignition timing can be progressively retarded from approximately maximum brake torque as the transition power output level is approached. A peak pressure within the combustion volume can be achieved and a 10% to 90% burn duration of the mixture can occur prior to before approximately 35° past a top dead center position of the piston. Alternatively, a peak pressure within the combustion volume can be achieved in a range of approximately 10° to 35° past a top dead center position of the piston and a 10% to 90% burn duration of the mixture can occur prior to before approximately 35° past the top dead center position of the piston.

For an octane rating of approximately 87, the compression ratio can optionally be greater than approximately 14:1. The compression ratio in the power mode can be lower than the compression ratio in the efficiency mode. Alternatively, the compression ratio in the power mode can be approximately equal to the compression ratio in the efficiency mode. The transition power output level can occur at approximately 70% of a brake mean effective pressure at the maximum power output level. Alternatively, the transition power output level can occur at approximately 60% of a brake mean effective pressure at the maximum power output level.

The delivering of the fluid to the combustion chamber can further include routing the inlet air from an air intake to an inlet port via an air intake route that can include limited exposures to engine heat such that the inlet air remains at or below a first target temperature that can, in some implementations, be less than the second target temperature. The inlet port can include a duct to deliver the fluid to a sleeve valve and/or a poppet valve such that, when the sleeve valve and/or poppet valve is open to deliver the fluid to the combustion volume, the fluid acquires a swirling motion and/or a tumbling motion as it enters the combustion chamber. The inlet port and/or the duct can also or in the alternative include a shroud configured to provide a tumbling motion of the delivered fluid in the combustion chamber. Alternatively or in addition, a first portion of the piston and a cylinder head or a second piston can be brought in close proximity during a compression stroke of the internal combustion engine while a second portion of the piston is not such that the mixture is forced out of the close region into a larger volume within the combustion volume to induce turbulence in the larger volume. At least one valve associated with the inlet port or with an exhaust port can be actively cooled, by a cooling system in a non-limiting example, to maintain the at least one valve below the second target temperature. The second target temperature can be less than a piston crown temperature at operating conditions of the internal combustion engine. Multiple ignition sites are provided within the combustion volume to shorten a duration of burn of the mixture.

Implementations of the subject matter described herein can provide one or more advantages. For example, motor vehicles operating on a typical drive cycle can, in some implementations described herein, achieve a 30% fuel economy savings with little increase in the cost of the engine relative to previously available solution. Additionally, the high charge density within the combustion chamber can allow for operation at lean enough mixtures to significantly reduce the formation of harmful nitrous and/or nitric oxides. This enables these vehicles to meet strict emission norms without expensive or sophisticated emissions controls.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 9A and FIG. 9B are a side cross-sectional diagram and a top cross-sectional diagram, respectively, showing generation of turbulence in a cylinder using poppet valves;

When practical, similar reference numbers denote similar structures, features, or elements.

DETAILED DESCRIPTION

Figure 1:
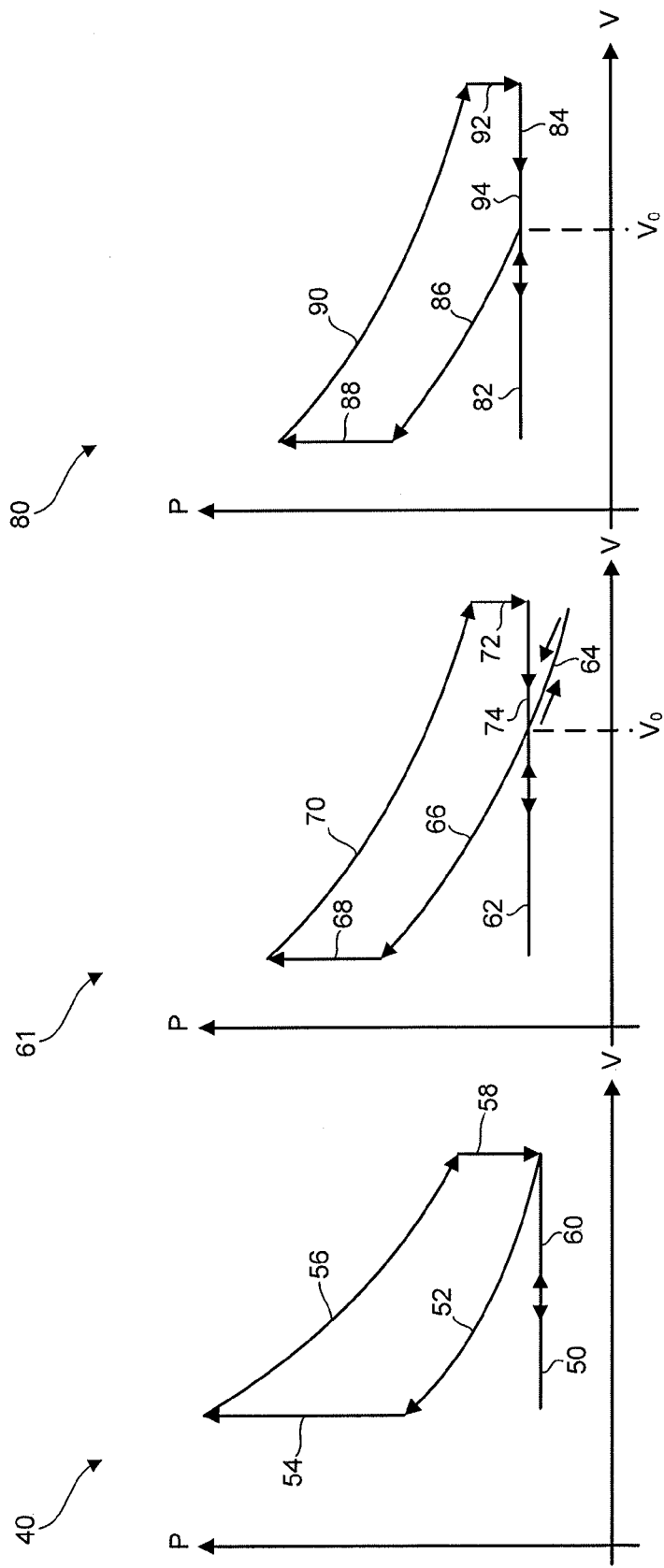
FIG. 1A, FIG. 1B, and FIG. 1C show charts illustrating features of an idealized Otto cycle and two examples of idealized Atkinson cycles.

Internal combustion engines can be built with mechanically complex and relatively expensive features designed to improve performance and efficiency to accommodate typical use cycles in which the engine may be frequently operated at less than wide open throttle. For example, variable valve timing, variable compression ratios, and the like have been shown to be useful for producing an engine with both high efficiency and high power density, albeit not at the same time. However, engines designed for inexpensive manufacturing are generally constrained to relatively simple mechanical structures and therefore cannot readily include such features. To address these and potentially other issues with currently available solutions, one or more implementations of the current subject matter provide methods, systems, articles or manufacture, and the like that can, among other possible advantages, provide an internal combustion engine that achieves improved fuel efficiency across a broader range of engine loads and can, therefore, provide improved efficiency a typical drive cycle for a motor vehicle. Other uses of internal combustion engines, including but not limited to agricultural and landscaping equipment, power generators, pump motors, boats, planes, and the like, can also benefit from the provided improved efficiency over a larger range of engine loadings.

An internal combustion engine consistent with implementations of the current subject matter can operate with improved efficiency at low and moderate loads while also providing a high power density at high loads. Efficiency can thereby be maximized at engine operating conditions that are used most frequently and under which a majority of fuel is consumed.

According to an implementation, for low to moderate engine loads, for example up to about 6 bar BMEP, an engine can be operated in a first, "efficiency" mode at maximum brake torque (MBT) timing at all throttles including wide open throttle (WOT), with a lean air-fuel mixture. In the efficiency mode, the engine may be operated with compression ratios of approximately 15:1 for normal 87 octane gasoline operation. In a conventional engine, such a compression ratio would require the spark to be further retarded, thus limiting the efficiency that can be achieved. However, the current subject matter includes several features enabling compression ratios in this range without engine knock. These features can include one or more of a relatively low burn temperature (e.g. from a lean air-fuel mixture or by limiting heat sources to which the air and/or fuel are exposed both within and prior to entering the combustion chamber), fast burn times from the turbulence of the incoming air and/or fuel, and a combustion chamber relatively devoid of hot spots. These features are explained in greater detail below. The high compression ratio, relatively low burn temperature, and open throttle can yield highly efficient engine performance at low to mid level load operation conditions at which the most fuel is consumed during drive cycle operation. One or more of high turbulence, fast burn, a knock resistant combustion chamber, and other features described herein can allow the use of a higher compression ratio than would ordinarily be possible even when using a stoichiometric air-fuel mixture.

For loads above the maximum obtainable in lean operation, the engine can be operated in a second, "power" mode, in which the air/fuel ratio is decreased to provide a richer mixture (e.g., approaching stoichiometric) and more power to the engine. It should be noted that a typical stoichiometric air/fuel ratio for gasoline is approximately 14.7 mass units of air per mass unit of fuel. For purposes of this disclosure, the air/fuel ratio will be discussed in terms of a ratio of the actual air/fuel ratio to a stoichiometric air/fuel ratio, which is typically referred to using the Greek letter $\lambda$ (lambda). Attributes of the engine are controlled at these higher pressures to prevent knocking, including adjusting the timing of the spark ignition to be later than the MBT timing. Changeover between efficiency mode and power mode can in some example occur at approximately 6 to 7 bar BMEP. However, with technology improvements, such as for example the ability to move more air into the engine, the transition from the efficiency mode to the power mode can occur at a higher BMEP. Emissions or other constraints may require in some implementations that the transition occur at lower BMEP. These and additional features of the invented technology are explained in greater detail below.

Figure 2:
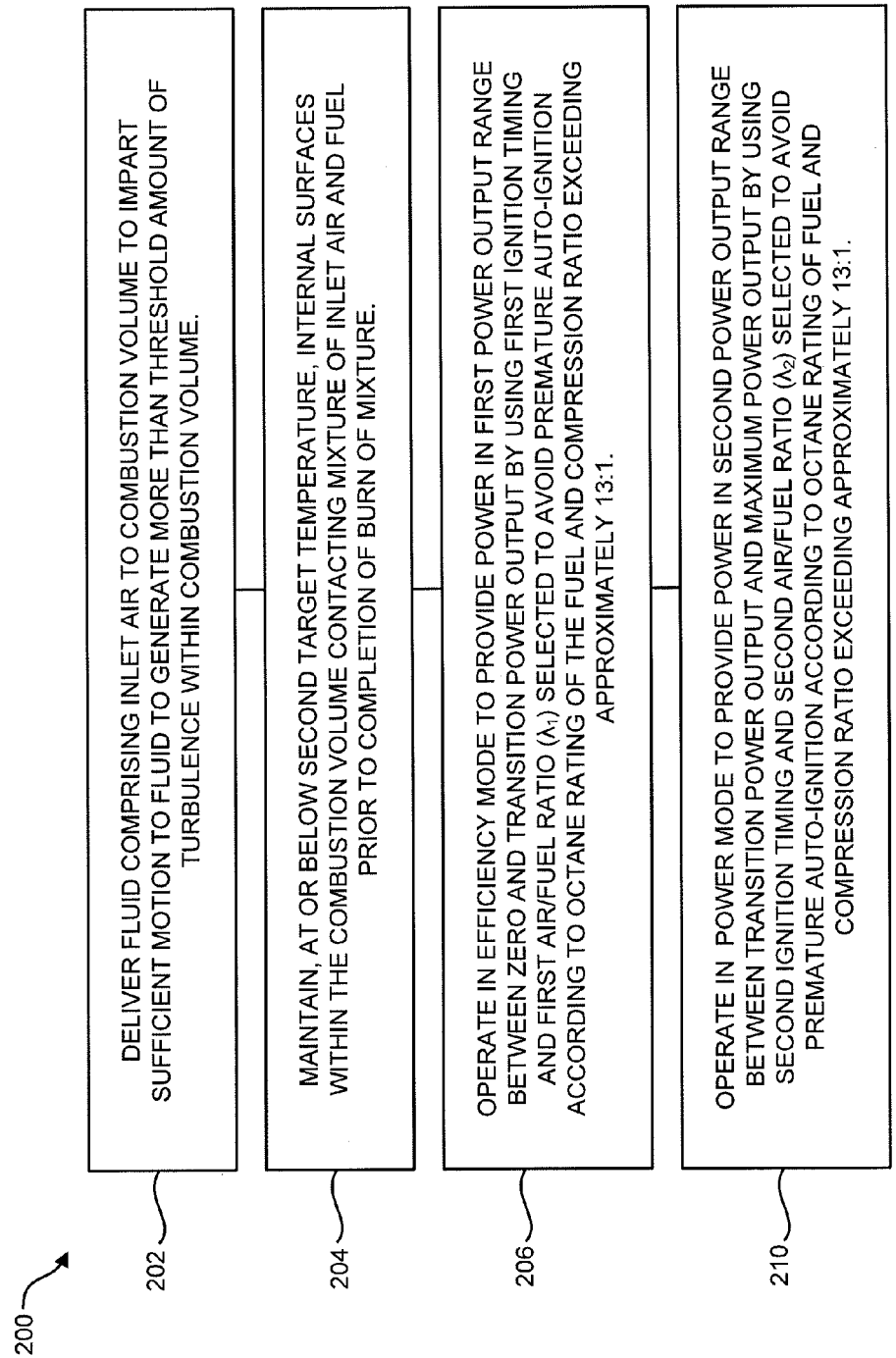
FIG. 2 is a process flow diagram illustrating a method having one or more features consistent with the current subject matter.

FIG. 2 shows a process flow chart illustrating an engine operation method including at least some features consistent with implementations of the current subject matter. At 202, a fluid that includes at least inlet air (and that can, in some implementations include inlet air plus fuel) is delivered to a combustion chamber of an internal combustion engine. The delivering imparts sufficient motion to the fluid to generate at least a threshold amount of turbulence within the combustion volume, which is defined by at least a cylinder wall and a piston. The threshold amount of turbulence can be sufficient to cause a rapid burn of the air-fuel mixture once ignition is triggered. For example, in some implementations, the threshold amount of turbulence is such that a peak pressure within the combustion chamber is achieved and a 10% to 90% burn duration of the mixture occurs prior to the piston or pistons reaching a position that is approximately 35° past TDC, or alternatively between approximately 10° and 35° past TDC. In some implementations, the fluid can be delivered at a temperature below a first target temperature, for example by actively cooling the air (e.g. via a heat exchanger or the like) routing the air through one or more ducts that are shielded or physically separated from sources of excessive heat within the engine compartment.

At 204, the internal surfaces within the combustion volume that come into contact with a mixture of the inlet air and a fuel prior to completion of a burn of the mixture are maintained at or below a second target temperature that can, in some implementations be less than a piston crown temperature at operating conditions of the engine. The first and/or the second threshold temperatures can be selected to reduce the tendency of the fuel-air mixture to auto-ignite and/or to cause knock.

At 206, the internal combustion engine is operated in an efficiency mode in which a power output is in a first power output range between zero and a transition power output. The efficiency mode includes use of a first ignition timing and a first air/fuel ratio of the mixture that are selected in combination to avoid premature auto-ignition of the mixture while operating the engine in the first power output range. Selection of the first ignition timing and the first air/fuel ratio, which can in some implementations be expressed as the ratio ($\lambda_1$) of the actual air/fuel ratio relative to the air/fuel ratio that provides a stoichiometric ratio for the fuel being burned, can be performed according to an octane rating of the fuel and a compression ratio exceeding approximately 13:1.

At 210, the internal combustion engine is operated in a power mode in which the power output is in a second power output range between the transition power output and a maximum power output. The power mode includes use of a second ignition timing and a second air/fuel ratio of the mixture selected to avoid premature auto-ignition of the mixture in the second power output range. Selection of the second ignition timing and the second air/fuel ratio, which can in some implementations be expressed as the ratio ($\lambda_2$) of the actual air/fuel ratio relative to the air/fuel ratio that provides a stoichiometric ratio for the fuel being burned, can be performed according to the octane rating of the fuel and the compression ratio exceeding approximately 13:1. A controller and/or a state detector to characterize and/or adjust operation of the engine can perform one or more of the functions noted above in regards to FIG. 2.

In some implementations, the efficiency mode can be in a range of approximately 0.2 to 0.7 of the a maximum brake mean effective pressure (BMEP) for the engine and the power mode can be in a range of greater than approximately 0.7 of the maximum BMEP up to the maximum BMEP. Alternatively, the efficiency mode can be in a range of approximately 0.4 to 0.6 of the maximum BMEP while the power mode is in a range of approximately 0.6 of the maximum BMEP up to the maximum BMEP. The maximum BMEP can in some implementations be between approximately 8 bar and 15 bar. A compression ratio of 14:1 or 15:1 or greater can be used depending at least in part on an octane rating of the fuel used. For example, the current subject matter can be used in diesel engines or with compressed natural gas, in which the compression ratio can be as high as 18:1, 20:1, or even higher. The compression ratio to be used can be determined for a given fuel octane rating by setting the peak pressure between approximately 10° and 15° after top dead center (TDC) for maximum efficiency lean operation (e.g. $\lambda$ greater than 1). A coefficient of variation of the indicated mean effective pressure can advantageously be less than 5%, and wide open throttle operation can be enabled at the knock limit. Turbulence in the air and/or fuel-air mixture added to the combustion chamber can be used to achieve a fast burn duration, without excessive preheating of fuel that might otherwise cause knock. Direct fuel injection into the combustion chamber (e.g. as a liquid) can be used to limit a dwell time of the fuel at an elevated temperature and to provide knock resistance. Temperature control of the inlet air and/or the internal surfaces of the combustion chamber can be achieved using one or more of the approaches described herein or other similar variants. The second target temperature can advantageously be kept lower than the maximum piston crown temperature during the combustion cycle, which can, for example, vary between approximately 200° C. and 350° C. or between approximately 250° C. and 350° C., and can in some examples be below approximately 300° C. or alternatively below approximately 400° C., or the like. In some implementations, the first target temperature can also be kept within or below the specified ranges for the second target temperature.

In an implementation of the method shown in FIG. 2 and discussed above, a stoichiometric or near stoichiometric fuel mixture can be used for both of the first air/fuel ratio ($\lambda_1$) and the second air/fuel ratio ($\lambda_2$). That is, the air/fuel ratio, $\lambda$, is maintained at or near 1 in both of the efficiency mode and the power mode of the engine. The first ignition timing during the efficiency mode can be at or near maximum brake torque (MBT), which can in some cases occur prior to TDC so that the pressure in the combustion volume peaks at approximately 10° to 15° past TDC. As the load on the engine increases and the power out exceeds the transition power output such that the engine must operate in the power mode, the second ignition timing can be progressively retarded from MBT with increasing load on the engine. In an engine having one or more of the features described below, the retarding of the ignition timing can be accomplished despite the presence of a stoichiometric fuel/air mixture without causing knock. In some examples consistent with this implementation, the peak pressure in the combustion chamber can advantageously be reached prior to 35° past top dead center, and the duration of the burn between 10% and 90% of the total fuel in the combustion chamber can advantageously occur prior to 35° past TDC or optionally prior to 25° past TDC.

In another implementation of the method shown in FIG. 2 and discussed above, the first air/fuel ratio, ($\lambda_1$) can be greater than 1 (i.e. a lean mixture) and variable throughout the efficiency mode. As the load on the engine increases in the efficiency mode toward the transition power output, power output of the engine is increased by progressively decreasing the fuel/air ratio ($\lambda$), for example by moving from highly lean to closer to a stoichiometric mixture of $\lambda=1$. The first ignition timing (i.e. during the efficiency mode) can be at or near maximum brake torque (MBT) at lowest power. In this example, the timing can be retarded prior to reaching the transition power output as necessary to reduce knock. As the load on the engine increases and the power out exceeds the transition power output such that the engine must operate in the power mode, the second ignition timing can be progressively retarded from MBT with increasing load on the engine. As with the above-mentioned implementation, in an engine having one or more of the features described below, the retarding of the ignition timing can be accomplished despite the presence of a stoichiometric fuel/air mixture without causing knock. In some examples consistent with this implementation, the peak pressure in the combustion chamber can advantageously be reached between 10° and 35° past top dead center, and the duration of the burn between 10% and 90% of the total fuel in the combustion chamber can advantageously occur prior to 35° past top dead center.

Figure 3:
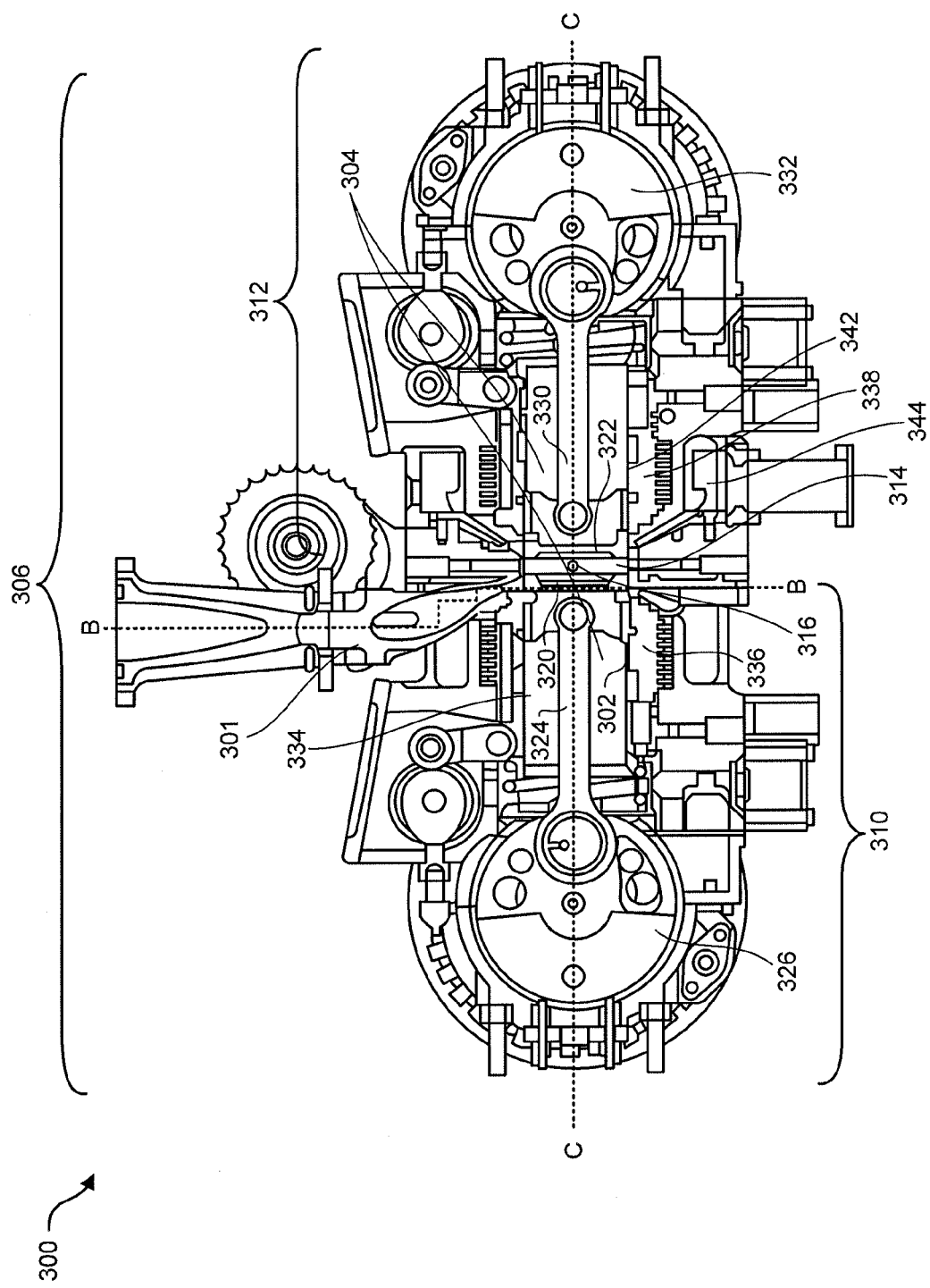
FIG. 3 is a cross-sectional diagram showing an engine having one or more features compatible with the current subject matter.

FIG. 3 shows a cross-sectional view of an example of an internal combustion engine 300 capable of implementing features of the current subject matter. Further details of this engine and similar engines are set forth in U.S. Pat. No. 7,559,298, entitled "Internal Combustion Engine" and in U.S. patent application Ser. No. 12/860,061 (published as Publication No. 2011/0041799A1), entitled "High Swirl Engine," each of which is assigned to the owner of the instantly disclosed subject matter and which is incorporated by reference herein in its entirety. As shown in FIG. 3, an air intake inlet port 301 delivers air that is delivered either alone or as part of an air-fuel mixture into a cylinder 304 that is defined by an engine body 306. As shown in FIG. 3, the engine body 306 can include a left casting 310 and a right casting 312 that are mounted to a center connecting piece 314 which can be in the form of a ring. The center connecting piece 314 can also include one or more spark plug sleeves 316 through which spark plugs can be inserted. The engine 300 is configured such that a left piston 320 and a right piston 322 reciprocate within the cylinder 304 along a centerline C of the cylinder 304. The left piston 320 is connected to a left connecting rod 324, which in turn connects to a left crankshaft 326. The right piston 322 is connected to a right connecting rod 330, which in turn connects to a right crankshaft 332. The left piston 320 reciprocates within the cylinder 304, and is slidably movable to the left and right along the cylinder wall 334. The right piston 322 also reciprocates within the cylinder 304, and is slidably movable to the left and right along the cylinder wall 334.

FIG. 3 shows a piston configuration in which two pistons are arranged in an opposing manner in the same cylinder 304 so that the combustion chamber at top dead center (TDC) is defined primarily by the pistons 320, 322 and the cylinder walls 334. In other engine designs consistent with one or more features of the current subject matter, the cylinder walls, a piston at one end, and a cylinder head at the other end can define a combustion chamber. The diameter of the pistons 320, 322 in the engine 300 can be smaller than that of conventional pistons, and no cylinder heads are required. The omission of separate cylinder heads and use of a smaller piston diameter can provide a low surface area to volume ratio within the combustion chamber, which as noted elsewhere herein, can limit heat transfer losses from the combustion chamber. Heat that would otherwise be lost to heat transfer can instead contribute to the work performed by the pistons 320, 322 during their power stroke (e.g. making the power stroke closer to the idealized adiabatic condition). In some implementations, an advantage of the opposed piston arrangement of the engine 300 is that, by having a low surface area to volume ratio, the surface area of the combustion chamber through which heat may escape is minimized. As a result, increased heat transfer from a high velocity or high turbulence combustion mixture may have a lesser impact on the engine 300 than in other engine configurations. In some implementations, the pistons 320, 322 can include low thermal conductivity material (optionally including but not limited to cast iron and the like) due to their smaller diameter than pistons in other engine designs. Using a low thermal conductivity material can enable more of the heat generated in the combustion event to be retained in the gas and therefore available to do work.

FIG. 3 also illustrates a first coolant-path defining piece 336 associated with the left casting 310 and a second coolant-path defining piece 338 associated with the right casting 312. One or more sleeve valve bodies 340, 342 can be slidably movable to the left and right (from the FIG. 3 perspective) relative to the respective coolant-path defining pieces 336, 338. As shown in FIG. 3, a first sleeve valve body 340 is associated with the left casting 310 and a second sleeve valve body 342 is associated with the right casting 312. The first sleeve valve body 340 can function in association with the inlet port 301 and the second sleeve valve body 342 can function in association with an exhaust port 344.

In FIG. 3, the left piston 320 and right piston 322 are disposed in the cylinder 304 as they would be at top dead center (TDC), with the combustion volume, which in this example is defined by the cylinder wall 336, and the piston heads of the left piston 320 and right piston 322, at its smallest. An engine consistent with implementations of the current subject matter can be configured such that the ignition timing occurs before, at, or after the minimum combustion volume (before, at, or after top dead center) as discussed elsewhere herein.

In conventional engines, in addition to adding to the surface area of the combustion chamber, the cylinder heads house the inlet and exhaust poppet valves. These valves define localized hot spots in the combustion chamber, possibly reaching temperatures as high as 650° C. As noted above, localized hot spots can be a significant contributing factor to engine knock. Conventional inlet and exhaust valves can also be omitted in an engine 300 as shown in FIG. 3, and instead replaced by the inlet port 301 covered by the first sleeve valve body 340, and an exhaust port 344 covered by a second sleeve body 342. The first sleeve valve 302 reciprocates to open and close the inlet port 301. The second sleeve valve 342 reciprocates to open and close the exhaust port 344. Further details of the inlet valve, exhaust valve and sleeve valves are disclosed in the above-incorporated U.S. Pat. No. 7,559,298 and U.S. Publication No. 2011/0041799A1, but of relevance is that the inlet and exhaust valves do not define localized hot spots within the combustion chamber. They remain mostly hidden by the piston crown near TDC and are also maintained at temperatures that are typically below a second target temperature of 400° C., for example using one or more approaches as discussed in more detail herein. These relatively low temperatures can reduce heat transfer to the air-fuel mixture, thereby increasing knock margin and enabling a higher compression ratio.

Moreover, while reducing heat transfer through the cylinder walls 434 can be desirable, it can also be important to maintain the cylinder walls 434 and other internal surfaces to which inlet air, fuel, and the air-fuel are exposed at a low enough temperature to reduce or eliminate instances of spontaneous ignition of the end gas (i.e. the last of the gas to combust) during burn. An engine can accomplish this by a cooling fluid circulating around the first and/or sleeve valve 302, 342 to remove heat. Further details of such a cooling system are disclosed in the above-incorporated U.S. Pat. No. 7,559,298, but in general, a cooling fluid can be pumped through grooves around the outer surface of the sleeve portion 302, 342. Heat convects from the sleeve portion 302, 342 to the cooling media, and is removed by the cooling media from the system.

Figure 4:
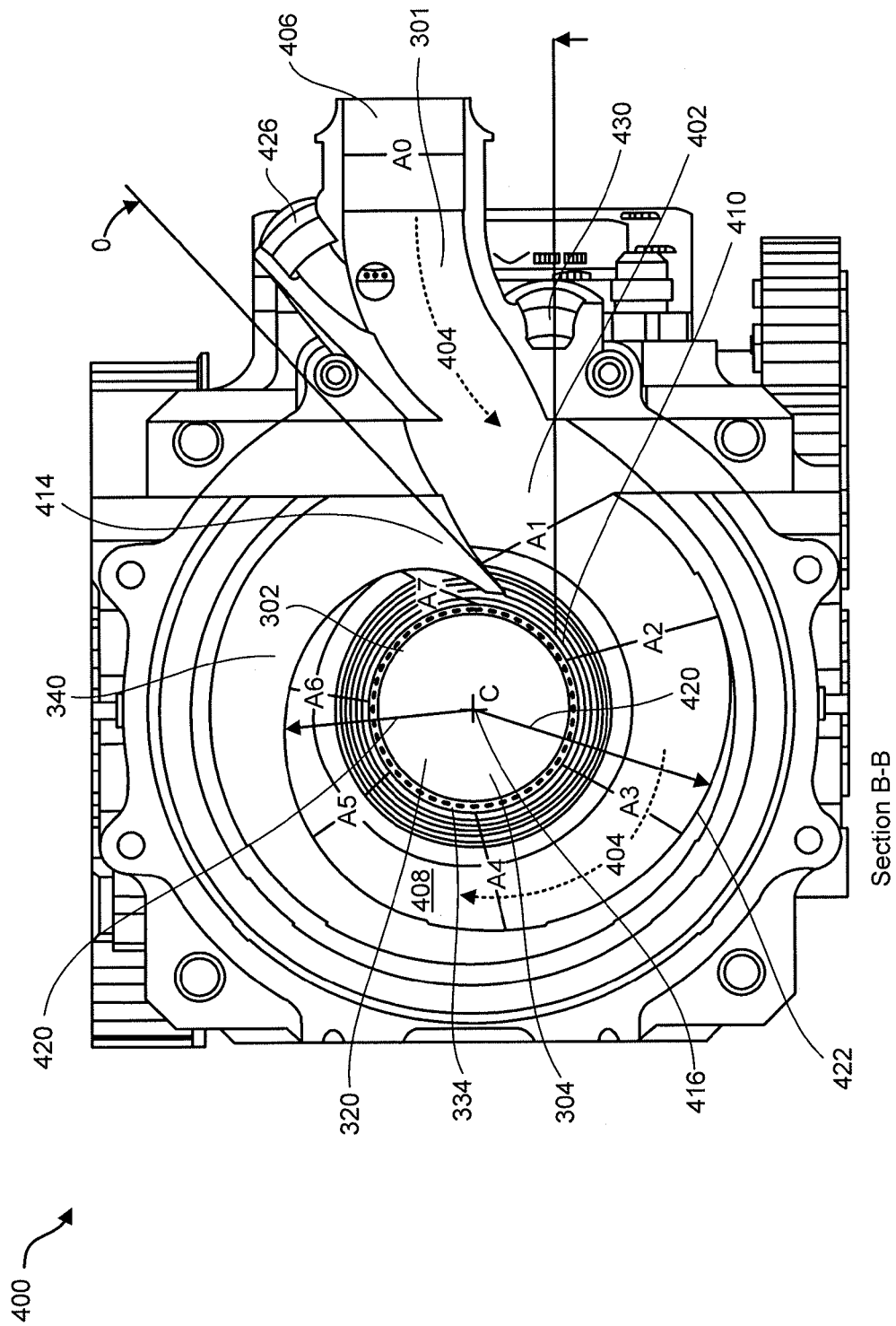
FIG. 4 is another cross-sectional diagram of the engine shown in FIG. 3.

FIG. 4 is a second cross-sectional view 400 of the engine 300 shown in FIG. 3 along cut line B-B, which is shown in FIG. 3. As shown in FIG. 4, the first sleeve valve body 302 defines an inlet port 301 that directs a fluid 404, which can be an air/fuel mixture, air alone, or some other combination of gases, and/or entrained liquids, for injection into the cylinder 304. The inlet port 301 of FIG. 4 includes a swirl port inlet 406 through which the fluid enters and a swirl port outlet region 408 having a swirl port outlet 410 via which the delivered fluid 404 exits the inlet port 301 into the cylinder 304 (as shown in FIG. 4) around the periphery of the cylinder wall 334 to create a rotational flow in the combustion volume of the cylinder 304 during the inlet stroke of the piston. It should be noted that, in the engine 300 shown in FIG. 3, both of the left piston 320 and the right piston 322 move in opposition. The combination of the tangentially directed delivery of the delivered fluid 404 and the admitting of the fluid 404 at the periphery of the cylinder 304 (for example near the cylinder wall 334) can result in a rapid rotational flow field inside the combustion volume of the cylinder 304 during the inlet stroke. This ordered flow can persist through the cycle such that when the gases in the combustion volume are ignited, the flame is quickly swept across the combustion volume resulting in a very rapid and very reproducible combustion event. A sleeve valve body 302 used in association with an inlet port 302 having one or more of the features shown in FIG. 4 and described in reference thereto can be used in conjunction with an engine of any configuration (e.g., not solely with an engine configured for coaxial pistons sharing a common cylinder 304).

A sleeve valve body 302 as shown in FIG. 4 can be particularly effective at creating an ordered turbulent flow within the combustion volume because it allows entry of the mixture into the cylinder 304 around the whole periphery of the cylinder. Other types of valve (e.g., a poppet valve) may allow the turbulent flow conditions to be created predominantly around the inlet valve, which at its largest is generally a little larger than one-half the diameter of the cylinder 304. Lower pumping losses for the sleeve valve configuration may be realized because a similar rotational flow motion can be achieved for less piston work.

The cross-sectional areas A1-A7 of the inlet port 301 become progressively smaller as the fluid 404 travels through the port towards the cylinder 304. The decreasing cross-sectional area available for flow can cause the flow of the mixture 404 to enter cylinder 304 along the cylinder wall 334 and swirl toward the central axis C of the cylinder 304. Rotation of the fluid 404 can be about the central axis C that runs longitudinally through the geometric center of the piston as shown in FIG. 3.

Given this configuration, the fluid 404 can be pulled helically towards the center C into the low pressure region created by a piston's downward stroke. The exit of the inlet port 301 introduces the fluid 404 with a high velocity along the cylinder wall 334 as the retracting piston(s) pulls the fluid 404 into the cylinder 304. This action induces inwards motion towards center C of the cylinder 304 to increase the rotational velocity of the fluid 404 within the cylinder 304. In contrast to this arrangement, a mixture exiting a conventional poppet valve may be introduced substantially into the center of a cylinder and the velocity of the mixture may decrease as it expands towards the cylinder wall 334. Poppet valve engines incorporating port or valve induced turbulence as large as the sleeve valve may cause an increased pressure drop across the valve relative to a sleeve valve. However, using one or more features described below, use of poppet valves can also provide one or more of the advantages of the current subject matter.

The swirl rate of the fluid 404 in the cylinder 304 may vary. A high swirl rate or other type of motion intensive, potentially turbulent, fluid flow in the combustion volume can increase heat transfer to or through the cylinder walls 334 and other internal surfaces of the combustion volume. However this type of fluid motion can also promotes rapid burning of the air-fuel mixture in the combustion volume. This can be a significant benefit in that engine knock is a function of both temperature and time. Even though the combusted mixture may reach temperatures where knock may otherwise occur, the turbulence of the inlet mixture can prevent the occurrence of knock by burning more quickly than the time required for the fuel to be ready for spontaneous ignition. This increase in knock margin may further enable the higher compression ratios in the efficiency mode and less ignition retardation in the high power mode described herein. The tradeoff between the heat transfer promoted by the turbulent inlet mixture and the knock resistance may be balanced and optimized for different engines.

The swirl rate of mixture M within the cylinder 304 can be adjusted by changing the cross-sectional area A1 of the inlet port 301. In some implementations, a mean port flow velocity of mixture M traveling through the inlet port 301 can be 90 m·sec$^{-1}$. The term "mean port flow velocity" indicates an arbitrary nominal average velocity of the air as it travels through the port 301. The mean flow velocity of mixture M within the port 301 may vary. This could result in mixture M swirling in the cylinder 304 approximately six times faster than the crankshaft speed (e.g., in a small bore engine).

The swirl in the cylinder 304 can be proportional to the cross-sectional area of the port 301. If the cross-sectional area A1 of port 301 is increased, the tangential velocity of mixture M entering the cylinder 304 is reduced. Accordingly, the rotation speed of the swirl of mixture M is also reduced. The angle that mixture M enters the cylinder 304 changes with its tangential velocity. High tangential velocities result in a shallow angle, lower velocities result in a steeper angle. Shallow angles reduce the effective valve open area limiting the maximum flow through the valve. Additionally, an inlet port 301 can be designed so that the tubular section of the inlet port 301 approaches the valve at the angle that the flow is expected to cross the valve opening. A design with high swirl may have a lower maximum mass flow and a more tangential arrangement of the inlet port 301 as it approaches the valve. Correspondingly a lower swirl port 301 may have a larger maximum flow and a steeper approach to the valve. Other examples of inlet ports that can provide variable amounts of swirl and other imparted fluid motion that can generate desired turbulence in the combustion chamber are described in greater detail in previously incorporated U.S. Patent Application Publication No. 2011/0041799A1.

FIG. 4 further illustrates that the exit of the inlet port 301 forms an angle θ for the mixture M entering the cylinder 304. In some implementations, the angle θ may be 90° with the flow arriving from a single quadrant. In this manner, introducing a tumbling motion to the flow instead of a swirling motion can induce turbulence. However, the angle θ can range between approximately 90° and tangential in various implementations within the scope of the current subject matter, and the flow can be from more than one quadrant. FIG. 4 illustrates that the swirl port inlet 406 of the inlet port 301 can include a slight bend (e.g., is non-linear). The swirl port inlet 406 of the inlet port 301 can be designed to preferably force fuel droplets (e.g. injected into the swirl port inlet 406 by one or more fuel injectors 426, 430) to impinge on a hot sleeve surface of the sleeve valve body 340 to cause evaporation of these fuel droplets as they enter the inlet port 301 at section A1.

In an implementation, the inlet port 301 can have a diameter of 24.9 mm (55 mm-22.5 mm). Using this example, the area of the port 104 is 486 mm$^2$ which, when airflow within the port 301 is scaled against mean piston speed and cylinder volume, provides an air velocity of approximately 90 m/s for a 250 cm$^3$ engine running at 4000 rpm. These dimensions are exemplary, and are not intended to limit the scope of the technology described herein. These dimensions and values will change with different engine configurations and design requirements.

Poppet valves can be actively cooled to reduce hot surfaces within an engine. This can be accomplished by adding sodium metal inside a valve stem cavity. Alternatively of in addition, a coolant can be flowed in and out of a hollow valve stem or hollow valve head and stem, for example as discussed below.

Figure 5:
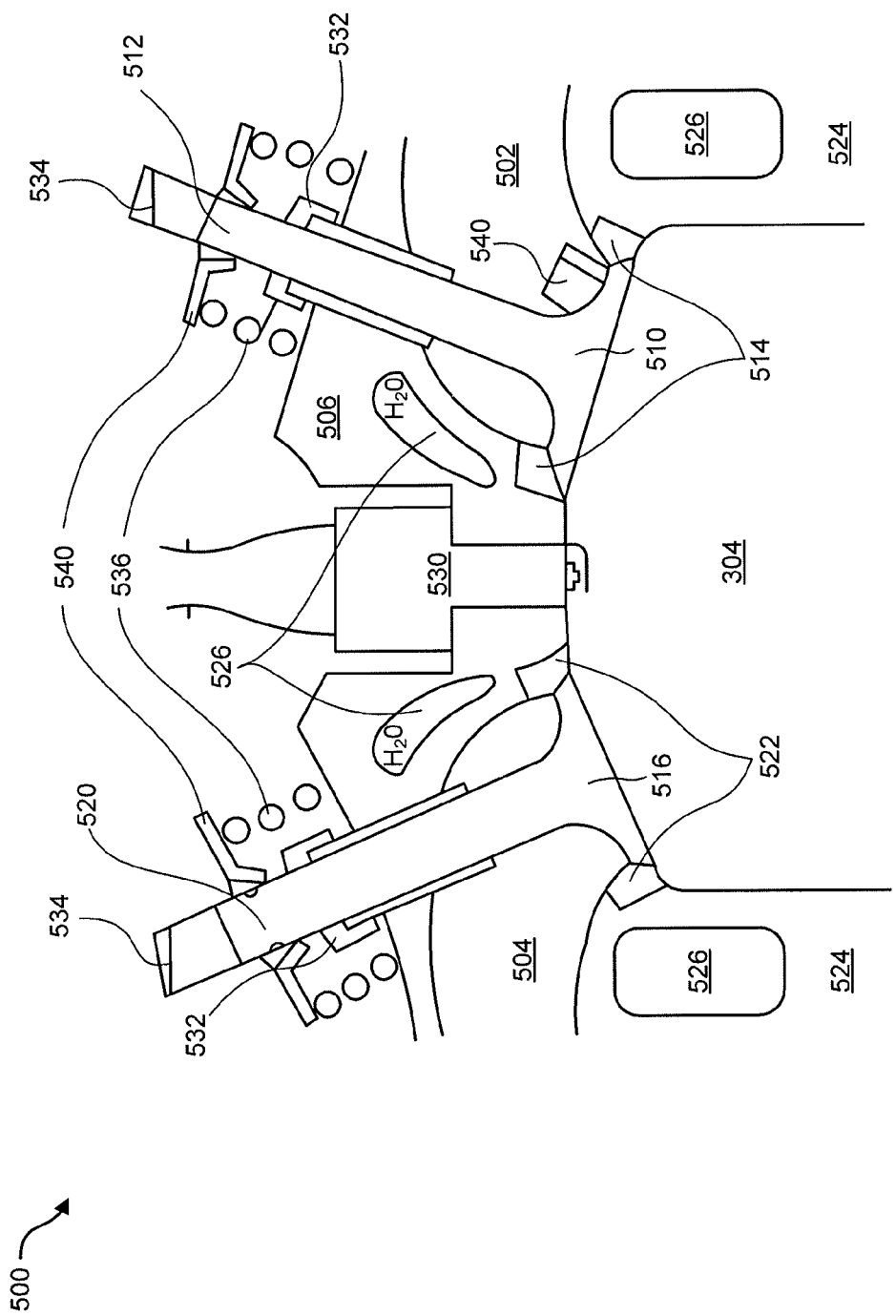
FIG. 5 is a cross-sectional diagram showing part of another engine having one or more features compatible with the current subject matter.

FIG. 5 shows an example of a part of an engine 500 having an alternative valve configuration to that described above that is nonetheless consistent with providing one or more of the advantages of the current subject matter. An inlet port 502 and an exhaust port 504 are positioned in or adjacent to a cylinder head 506 of an engine having each of one or more pistons in its own cylinder 304. Flow through the inlet port 502 shown in FIG. 5 is controlled by a first poppet valve assembly including an inlet valve head 510, an inlet valve stem 512, and an inlet valve seat 514, while flow though the exhaust port 504 is controlled by a second poppet valve assembly including an exhaust valve head 516, an exhaust valve stem 520, and an exhaust valve seat 522, respectively. The cylinder block 524 around the cylinder 304 as well as the cylinder head 506 in the vicinity of the first and second poppet valves assemblies can include coolant flow channels 526 through which coolant, such as for example water, a solution of anti-freeze in water, oil, or the like can be passed to convectively remove heat generated by combustion within the combustion volume in the cylinder 304. In the configuration shown in FIG. 5, a single spark plug 530 is shown at the center of the cylinder head 506. Other positions for the spark plug 530 or other ignition source are also within the scope of the current subject matter. More than one spark plug or other ignition source can also be used. Each valve assembly can include a valve stem seal 532, a rocker arm or valve lift arm 534 connected to one or more cams to activate (e.g. open) the valve, and a coil or spring 536 to urge the valve into a closed position against the valve seat 514 or 522. A spring retainer 540 retains the spring 536.

One or more of the valve heads 510 and 516, valve stems 512 and 520, and valve seats 514 and 522 as well as other components of the valve assemblies can include one or more materials of high thermal conductivity to facilitate conductive heat transfer of thermal energy received by these valve components from the burning combustion mixture to cylinder block 524 and/or cylinder head 506 and from there to the coolant in the coolant flow channels 526. Materials with high thermal conductivity that can be used in the valve components include but are not limited to beryllium-copper alloys, aluminum alloys, or the like. A shroud or other turbulence inducing element 540 can be included near the opening of the inlet port 502 into the combustion volume of the cylinder 304. This shroud or other turbulence inducing element 540 can force fluid flow passing form the inlet port 502 into the combustion volume to divert into the combustion volume in a manner that can cause a tumbling motion that can give rise to turbulence of the resulting combustion mixture within the combustion volume.

Figure 6:
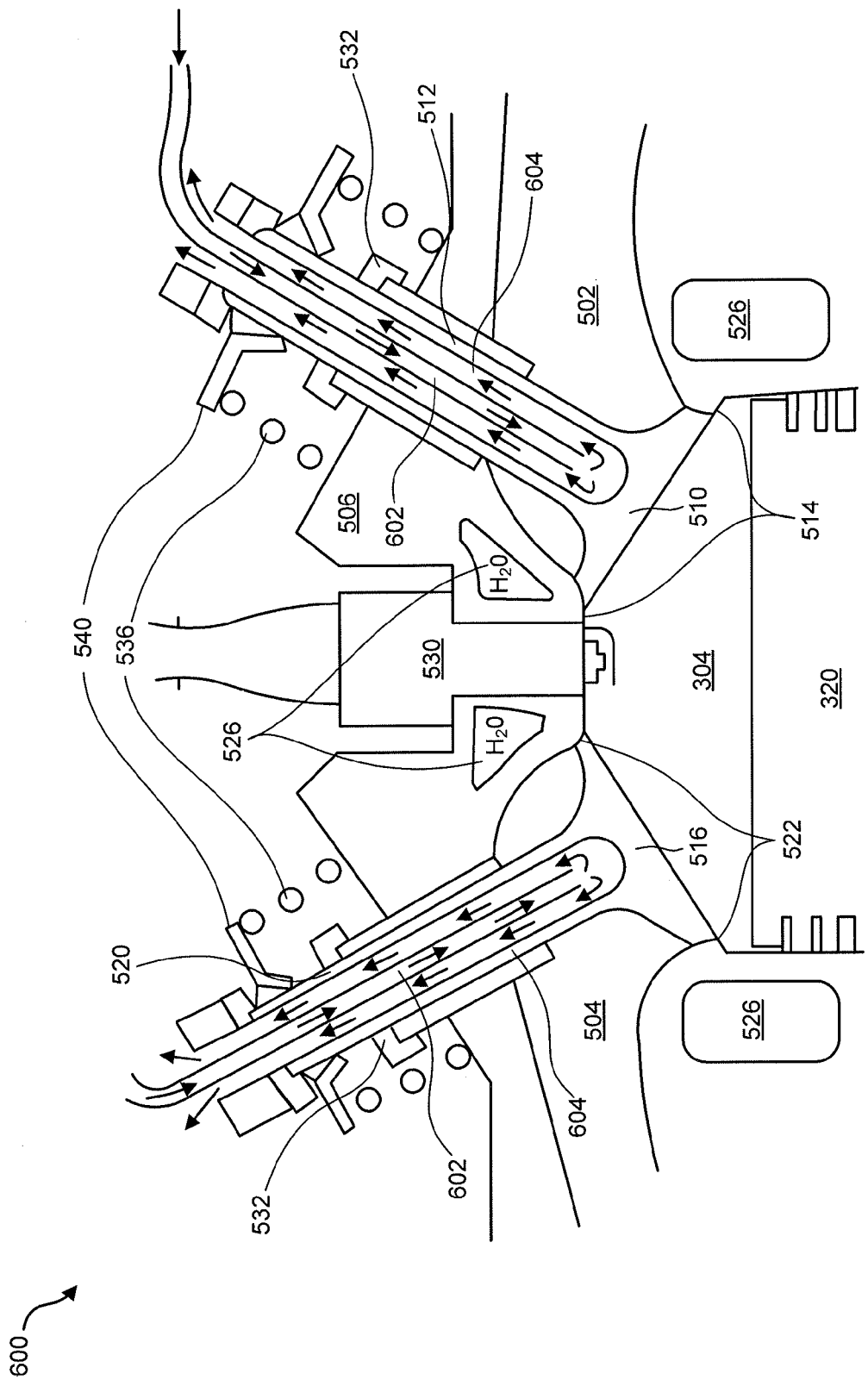
FIG. 6 is a cross-sectional diagram showing part of another engine having one or more features compatible with the current subject matter.

FIG. 6 shows another example of a part of an engine 600 having an alternative valve configuration to that described above that is nonetheless consistent with providing one or more of the advantages of the current subject matter. In addition to or as an alternative to one or more of the features shown in FIG. 5, one or valve assemblies can include features that allow oil or another coolant fluid (e.g. water, a solution of water in anti-freeze, etc.) to flow through the valve stem 512 or 520 to near the valve head 510 or 516 and back out to thereby convect away excess thermal energy received by valve components from the burning combustion mixture. As shown in FIG. 6, each valve stem 512 or 520 can include an axial coolant input channel 602 that conducts the coolant to near the valve head 510 or 516. The coolant can then flow back out of the valve stem through a coolant output channel 604 that can be annular, parallel, etc. to the coolant inlet channel 602. A similar result can be obtained using an alternative configuration in which finger followers for an overhead cam have a forked end similar to that shown in FIG. 7 for the rocker arm 534.

Figure 7:
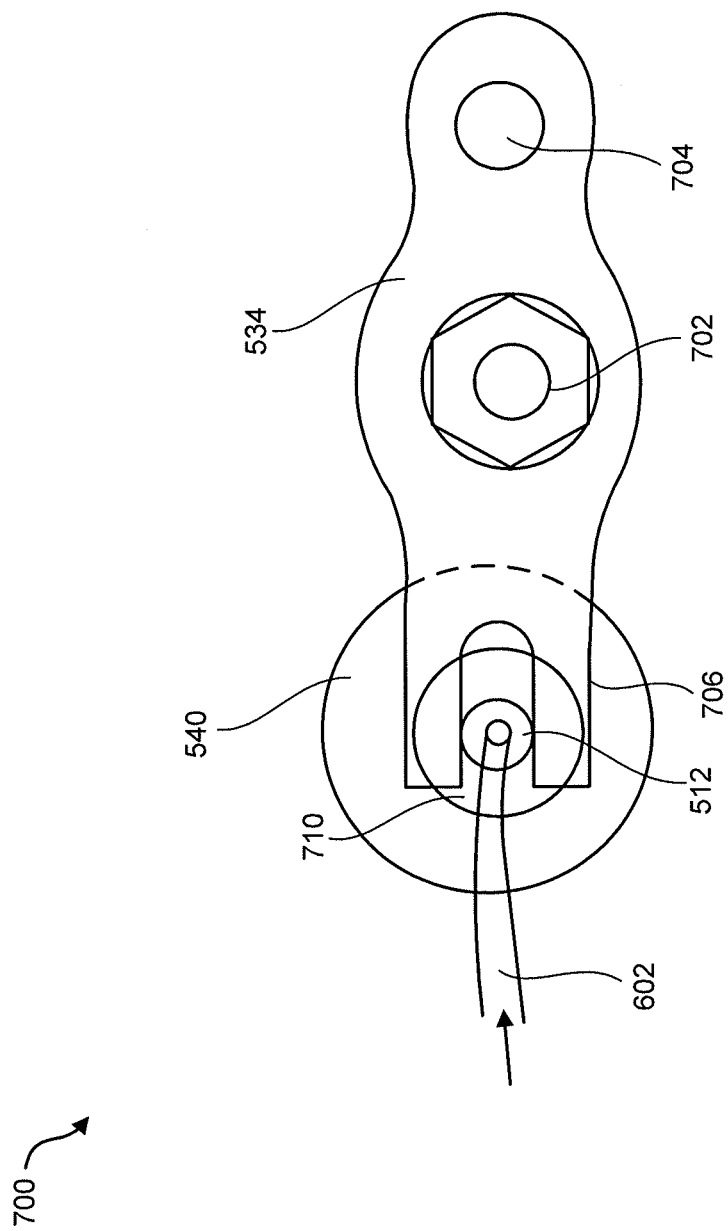
FIG. 7 is a top elevation diagram showing a rocker arm usable with a valve configuration shown in FIG. 6.

FIG. 7 shows a top view 700 of a rocker arm 534 and associated components that can be used with the actively cooled valve assemblies shown in FIG. 6. The rocker arm 534 pivots across a pivot 702 and include a push rod socket 704. At an end opposite the push rod socket, the rocker arm 534 can have a forked end 706 that fits around the hollow valve stem 512 to accommodate the coolant input channel 602. Also shown in FIG. 7 are a donut-shaped valve stem cap 710 and the spring retainer 540 that retains the spring 536 shown in FIG. 5 and FIG. 6.

Figure 8B:
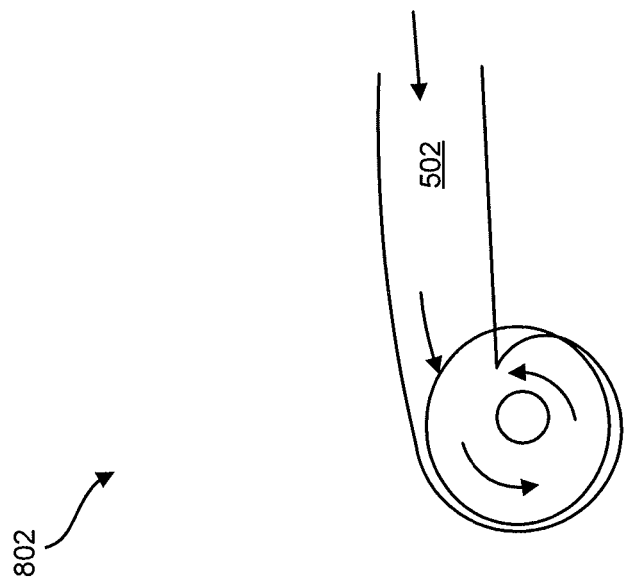
FIG. 8A and FIG. 8B are a perspective diagram and a cross-sectional diagram, respectively, showing features of a poppet valve configuration capable of imparting turbulent motion to a fluid passing through it.
Figure 8A:
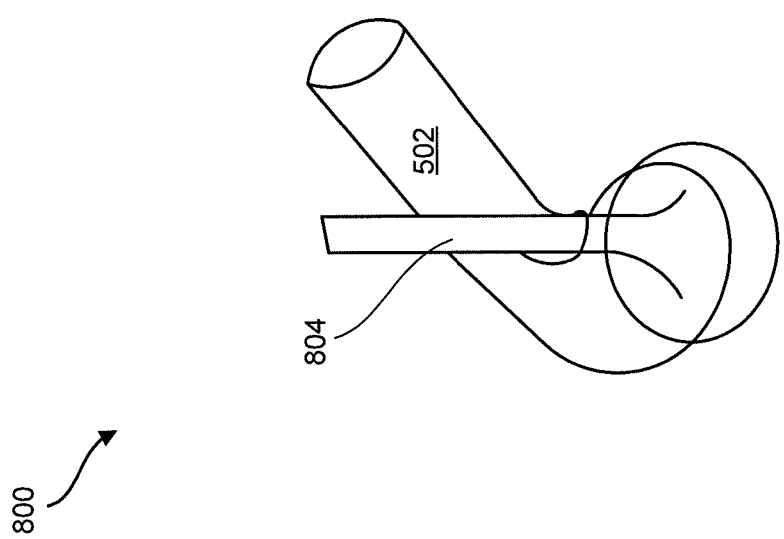

FIG. 8A and FIG. 8B respectively show a perspective view 800 and a top cross section view 802 of an air inlet port 502 compatible with a poppet-type inlet valve 804. As shown, the inlet port 502 can have a corkscrew-like, helical, or otherwise twisted or contorted shape that can impart a degree of rotational and/or turbulent motion to a fluid delivered to a combustion chamber via the inlet port 502.

FIG. 9A and FIG. 9B respectively show a side cross section view 900 and a top plan view 902 of a cylinder 304 having two inlet ports 502 and two exhaust ports 504 arranged on the cylinder head 506. Flow through the inlet ports 502 is controlled by two poppet-type inlet valves 904, each having an inlet valve head 510 and an inlet valve stem 512, that are positioned adjacent to one another on one side of the cylinder 304. Flow through the exhaust ports 504 is controlled by two poppet-type exhaust valves 906, each having an exhaust valve head 615 and an exhaust valve stem 520, that are positioned adjacent to one another on the other side of the cylinder 304. By operating one or the other of the poppet-type inlet valves 904 on the two inlet ports 502, an off-axis delivery of inlet port fluid can be provided into the combustion chamber within the cylinder 304. As shown in FIG. 9B, this approach can generate a rotational fluid flow field in the combustion volume whose axis of rotation is parallel to the cylinder axis. Alternatively, using an inlet port shroud 540 on one or more of the inlet ports 502 can cause diversion of fluid flow that can create a second rotational fluid flow field in the combustion volume whose axis of rotation is perpendicular to the cylinder axis. The techniques shown in FIGS. 9A and 9B can be used alone or in combination with each other or with other techniques for creating knock resistant combustion conditions as described herein.

The above descriptions address a number of features of engines that can enhance aspects of the operation of the engine to provide one or more of the benefits of the current subject matter as explained herein. However, the current subject matter can be used to operate a wide variety of different engines in which one or more of the features described above can be included or omitted in any feasible combination.

In accordance with implementations of the current subject matter, an engine can run in at least two modes: an efficiency mode at low and moderate loads, and a power mode for higher loads. In conventional engines running per the Otto cycle, the compression ratio is set by determining what the maximum ratio can be while producing maximum power at wide open throttle and MBT spark timing without producing knock. As noted above, an upper limit for a conventional engine's compression ratio is currently as high as about 10:1 for an engine running on standard 87 octane gasoline.

Then current subject matter can, in some implementations, enable higher compression ratios when compared to previously available approaches for a same engine running on the same fuel for a given knock level. For example, a gasoline engine using 87 octane gasoline as the fuel can attain a compression ratio of approximately 15:1 at MBT spark timing without knocking. The compression ratio attainable in the efficiency mode as described herein may be higher or lower than this example.

One factor contributing to the high knock margin and compression ratio is the turbulence induced as the air is introduced into the cylinder during the inlet stroke. As indicated above, the turbulence in the air-fuel mixture promotes rapid burning of the mixture. Rapid burning can increase engine efficiency at least in part because short burn durations allow the energy released from the fuel to act on the piston for a longer portion of the stroke, thereby producing more work than a slower burning combustion event. The enhanced turbulence provided by one or more features of the current subject matter can allow lean mixtures to burn as quickly as stoichiometric mixtures in a less turbulent environment. Stoichiometric mixtures with enhanced turbulence can burn even more quickly.

Completion of the burn can be earlier or later than that in the efficiency mode depending on other features of a particular engine. The determination of MBT timing in the efficiency mode can be determined in a known manner based at least in part on air flow, engine load, speed, mixture ratio, turbulence and a given type of fuel.

While port shape and valve configuration have been discussed extensively above, either piston to piston interaction as discussed in reference to engine 300 or piston to cylinder head interaction in engine 500 or 600 can be used to generate the necessary turbulence. If one portion of the piston is brought very close to either the opposing piston or the cylinder head while another portion is not, the air—fuel mixture is forced out of the close region into the larger volume. This action can give the mixture enough momentum to induce significant turbulence in the larger volume in an approach that is typically referred to as squish.

Additionally, the short burn duration can minimize the amount of time the end gas spends at high temperature. This reduces the likelihood of knock and allows an increase of the compression ratio above that found in conventional systems.

Another factor that can reduce knock and thereby enable increases in the compression ratio without knock is the reduction in hot spots within an engine. As noted above, hot spots within the combustion chamber can create localized knocking, and the compression ratio of conventional engines must generally be adjusted downward to account for this. An engine having fewer hot spots than conventional engines can operate at a higher compression ratio. As noted above, a sleeve valve can provide advantages in minimizing elevated valve temperatures, which can be a significant contributor to hot spots. Poppet valves may also be used in association with one or more active or passive cooling features for example as described above.

Another factor contributing to the ability to attain the high compression ratios described herein is the relatively cool surface temperatures of the walls around the combustion chamber. In particular, an engine including walls that are cooled by a cooling fluid flowing around the combustion chamber can have a reduced likelihood of spontaneous ignition of end gas during the combustion process, thus allowing further improvements in the compression ratio.

Other factors can also be employed in the efficiency mode in addition or as alternatives to those discussed above. To improve efficiency at low to mid range load requirements a lean air-fuel mixture, i.e. one having a air/fuel ratio ($\lambda$) larger than 1 (i.e. higher than stoichiometric), can be used. To reduce power, conventional engines typically throttle the air-fuel mixture, resulting in pumping losses across the throttle reducing engine efficiency. However, the same effect of reduced power can be achieved according to implementations of the current subject matter by running at wide open throttle (WOT) using a lean air-fuel mixture, thereby reducing or eliminating pumping losses and the resulting negative impacts on efficiency. A lean mixture can also allow an increase in the compression ratio, as lean mixtures burn at lower temperatures and pressures.

Using a lean mixture can provide additional benefits in some implementations. The lower temperature burn can result in a lower temperature differential and lower losses through the chamber walls at a given load at a given speed. Use of a lean mixture can also result in less fuel being burned. The burnt gases from lean combustion can have physical and chemical properties that more closely resemble diatomic nitrogen ($N_2$) than tri-atomic carbon dioxide ($CO_2$) and water ($H_2O$). Diatomic gases typically have higher specific heat ratio than tri-atomic gases, thereby giving lean mixtures inherently higher thermodynamic efficiency. A further benefit to the lean mixture is the production of reduced levels of nitrogen oxides ($NO_x$) because of the lower combustion temperatures. In some examples, the $NO_x$ emissions of an engine having one or more features of the current subject matter can have $NO_x$ emissions of less than 10% of a conventional engine under similar operating conditions. For light vehicles, this $NO_x$ emission rate can be low enough to not require after-treatment to meet Euro 4/5 emission specifications. Running very lean mixtures is known to lead to potential difficulties with the flammability (and thus reliable ignitability) of the air-fuel mixture. However, engine parameters such as high compression ratio, combustion volume turbulence, and combustion chamber wall temperatures can be optimized according to the teachings provided herein to allow a good burning mixture which is sufficiently lean to meet necessary the emissions specifications. Traditional engines that operate with lean mixtures or retarded timing run the risk of over heating due to the mixture continuing to burn late in the cycle leading to very high exhaust temperatures. Fast combustion of a lean mixture or a late fired richer mixtures can be desirable for acceptable engine durability.

The air/fuel ratio can be controlled to a predetermined level, for example by a carburetor, computer-controlled fuel injectors, or the like. When operating below the transition power output level (e.g. approximately 6 or 7 bar BMEP in some implementations), the efficiency mode can in one example use an air/fuel ratio ($\lambda$) of approximately 1.5 (e.g., 1.5 times the amount of air as would be present in a stoichiometric ratio). The air/fuel ratio ($\lambda$) can in some implementations be varied between a maximum lean condition and a less lean condition or even stoichiometric or rich (e.g., less air than would be required for a stoichiometric mixture). The air/fuel ratio (e.g., $\lambda$) is desirably maintained within a range that can be reliably ignited and that produces the power required.

At moderate compression ratios, the density of the mixture at spark initiation can in some cases be too low to support reliable combustion of a very lean mixture. However, because the current subject matter allows a high compression ratio, the density of the mixture is high enough to enable engine operation with such leaner mixtures, in some examples with a lambda of as much 1.5 to 1.6. Even leaner mixtures are within the scope of the current subject matter. Large natural gas engines can employ heavy turbocharging to increase the combustion mixture density sufficiently to run over 2 times as much air as needed. Implementations of the current subject matter can achieve these high densities without the cost and complexity associated with turbo charging. One drawback to the use of lean mixtures is a resulting low power density. However, as explained below, for high loads, for example above 6 bar BMEP, implementations of the current subject matter can step or gradually increase to a richer mixture approaching and/or exceeding stoichiometric.

Another factor improving efficiency can in some implementations be a reduced combustion volume surface area, for example as discussed above with regards to FIG. 3 and FIG. 4. The smaller surface area of the cool walls in such an engine can reduce the area from which heat is able to escape. This feature can increase the heat available to do work in the system, with an accompanying increase in efficiency.

Each of the features described herein can contribute to enhanced efficiency. Any one of these features, by itself, can enable an increase in the compression ratio and/or efficiency of an engine in the efficiency mode. Various features described herein may therefore be omitted or used in any feasible combination while providing an increased compression ratio and/or efficiency in accordance with implementations of the current subject matter.

Figure 10:
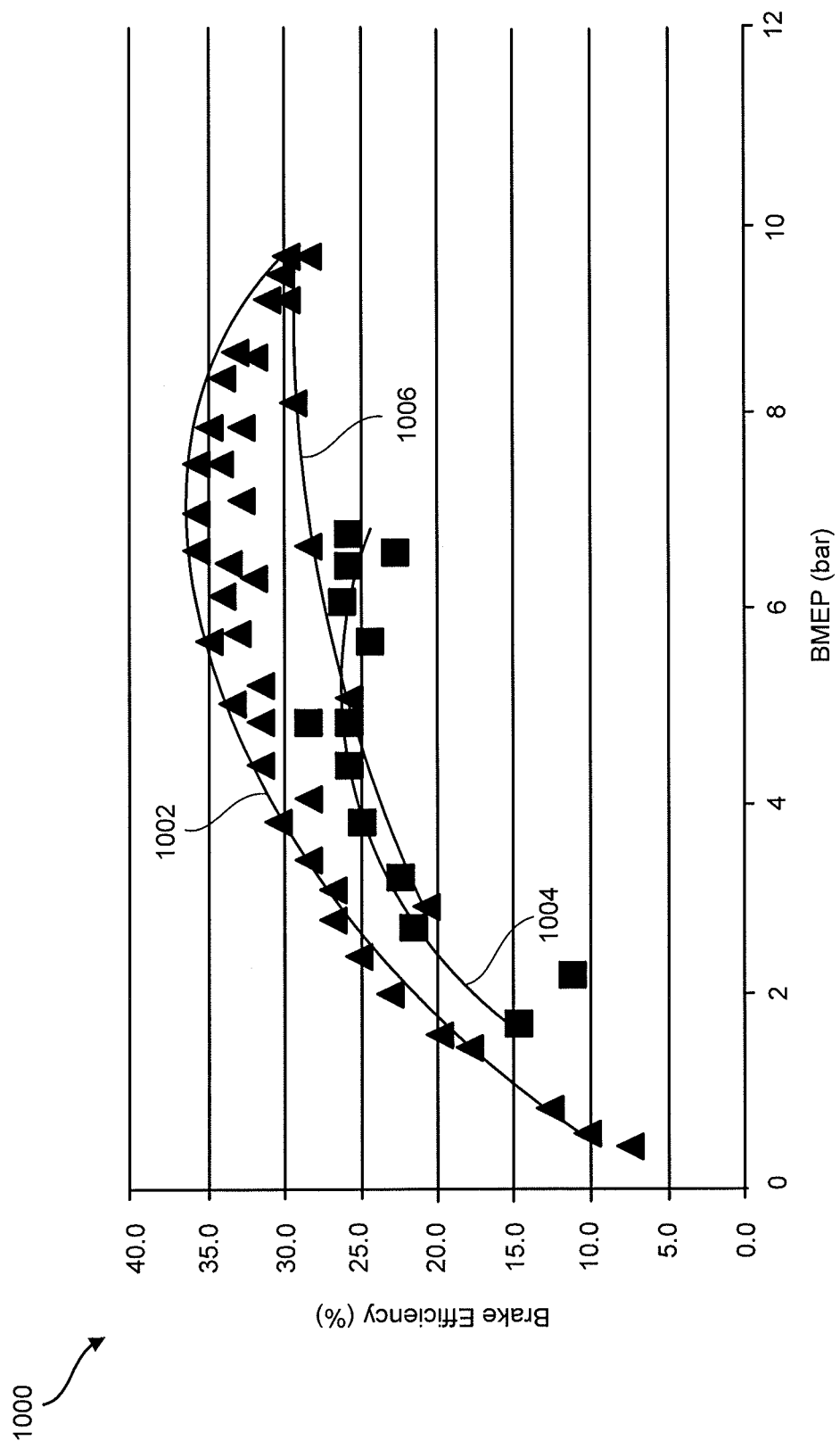
FIG. 10 is a chart comparing brake efficiency of an engine using features of the current subject matter to conventional engines over a range of power outputs.

FIG. 10 shows a chart 1000 illustrating engine efficiency plotted against brake mean effective pressure for three engines at normalized loads. The upper curve 1002 shows data for an engine operating in the efficiency mode up to a BMEP of approximately 7 bar and in the power mode from a BMEP of approximately 7 bar (e.g. a transition power output level) up to approximately 10 bar (e.g. a maximum power output level), consistent with implementations of the current subject matter. The other two curves 1004, 1006 reflect efficiency data for two other commercially available engines running by conventional methods. Both of the other commercially available engines were single cylinder engines of similar size to the test engine. As seen, the data 1002 for the engine run in a manner consistent with the current subject matter attains a higher efficiency, particularly at lower power output levels, than the other engines. As the power output increases to the maximum power output, the efficiency curves converge. However, because a engine consistent with the current subject matter can be designed to operate in the efficiency mode for a majority of its use with extra power supplied when needed by transitioning to the power mode, the overall fuel efficiency in a typical driving or other engine use cycle can be greatly improved over what is possible with conventional engine technologies.

As noted, one implantation of the current subject matter can run in the efficiency mode up to approximately 6-7 bar BMEP, at about which point the engine exhibits an efficiency of about 35% while a comparable conventional engine can achieve only 27% or 28% absolute efficiency at a similar power output. As seen in the chart 1000, efficiency of an engine consistent with the current subject matter can begin to tail off as the engine transitions to the power mode. The efficiency mode may be of particular interest for passenger vehicle operations because full power is rarely achieved, and usually not for long durations. The point at which the an engine consistent with one or more features described herein switches from the efficiency mode to the power mode can be set by and in conjunction with an expected drive cycle or use cycle for the engine. A proper matching of the engine power output at which peak efficiency is achieved to a most common power output needed in a vehicle drive cycle or engine use cycle can result in a relative improvement in efficiency over conventional engines by 25% of more (35% divided by 28%) as shown in FIG. 10.

Once an engine reaches some transition power output at which the knock limit is reached to generate more power under efficiency mode conditions, the engine can transition to the power mode, either in a step manner or gradually as operating conditions such as spark timing and air/fuel ratio ($\lambda$) are moved along a continuum to mitigate knock while providing greater power output. In one example, upon detecting engine pressures which exceed the transition power output, a processor (not shown) controlling the operation of an engine can commence a change in operating conditions. Alternatively, the changeover can be triggered by purely or predominantly mechanical means upon crossing or approaching a changeover threshold. The changeover of the air/fuel ratio ($\lambda$) and spark timing can be dependent on the load required.

Certain changes are made to the engine operating attributes as discussed above to allow the engine to transition to the power mode to handle higher loads. As noted, one such change is the enrichment of the air-fuel mixture from a lean mixture to one that is richer. Combustion of a richer mixture releases more energy, thereby producing the power needed at higher power densities. The air-fuel mixture can, for example, be provided at a stoichiometric air/fuel ratio (λ) in the power mode. The air/fuel ratio (λ) can be higher or lower than 1 (e.g. leaner or richer than stoichiometric) in the power mode, although in general a richer air/fuel ratio (λ) is used in the power mode than in the efficiency mode. The mixture can transition over a range of air/fuel ratios (λ) in a quick step, or gradually over a period of time.

Given the high compression ratio in engines consistent with the current subject matter, enriching the mixture in the power mode can result in knock without other alterations to the system. Thus, in addition to enriching the mixture, the spark timing can be retarded in the power mode some implementations (i.e., the spark can occur later in the combustion cycle, later crank angle, etc.) so that the peak pressures and temperatures within the combustion chamber are kept below knock levels, even for a large compression ratio. By way of example only, manifold or venturi vacuum can be used to provide control of the ignition spark timing and air/fuel ratio (λ).

As one example of the power mode, using a stoichiometric mixture to produce approximately 9 bar BMEP, spark timing may be set to within a couple degrees of TDC. This spark timing can be made possible in part by the turbulence of the air-fuel mixture, which, as noted above, can result in a faster burn of the mixture. The increase of the fuel in the mixture can further increase burn rate of the mixture. Thus, even starting within a couple degrees of TDC, most if not all of the mixture can be burned within 25° after TDC or alternatively within 35° after TDC. Completion of the burn can be earlier or later than that in the power mode. Retarded timing can in general reduce the efficiency of the engine in a trade-off for increased power output.

Ignition timing can be set late enough that a large fraction of the burn occurs after TDC. As the burn proceeds, the pressure and temperature induced by the compression ratio continue to decrease as the combustion chamber becomes larger to mitigate against spontaneous ignition of the end gas. In this manner, knocking in the power mode can be avoided. With a retarded spark, there may be a slight loss of expansion ratio and efficiency in the power mode. For example, using 87 octane gasoline, running an engine at 9 bar BMEP peak power with a stoichiometric mixture and spark timing resulting in burn completion at about 25° after TDC, the power mode can have an effective expansion ratio of about 12:1 or lower and an efficiency of about 30%. The 12:1 expansion ratio is still better than that achievable in previously available methods.

With the rich mixture used in the power mode, the throttle can be closed partially to limit the power generated by the engine. At small amounts of throttle closure, the difference between pumping loss across the throttle and the losses in a valve timing controlled flow can in general be minimal. For power levels from 100% down to nearly 50%, the pumping losses in the power mode may be minimal.

As indicated above, one problem with conventional engines is that they either run efficiently or powerfully, but not both, without the aid of expensive and complex variable compression ratio and variable valve timing techniques. The current subject matter can, in some implementations, optimize efficiency at low to moderate loads with while maintaining conventional efficiencies at high loads. These benefits can be provided without the complexity and expense associated with variable compression ratio and variable valve timing techniques.

As noted, features of the current subject matter can be applied to most engine configurations. Two stroke engines typically do not have hot exhaust valves exposed. With proper cooling design and turbulence, such engines can also be run in the above-described efficiency and power modes. Moreover, traditional four stroke engines can be modified to either significantly enhance the valve cooling, or ensure that the end gas region of the combustion chamber is cool. Both two and four stroke engines can further have the mixture turbulence optimized to be able get fast burn durations at lean mixtures without undue heat loss to the chamber walls.

Conventional operation of higher octane fuels can also be achieved using features described herein. Natural gas can be run with close to MBT timing at a geometric compression ratio of 15:1 also giving 35% peak efficiency. In one example, natural gas can be used as a fuel with an approximately 18:1 or greater compression ratio. For a dedicated natural gas engine, such compression ratios are readily achievable. However, in automotive applications where natural gas is used, it can be advantageous to be able to switch back and forth between natural gas and gasoline or other fuels. With an engine set up using the lean over-compressed operation for gasoline and conventional operation with natural gas, both fuels can be used at 15:1 geometric compression ratio and only the ignition timing needs to be changed. With the addition of VCR operation, both fuels can be optimized.

Figure 11:
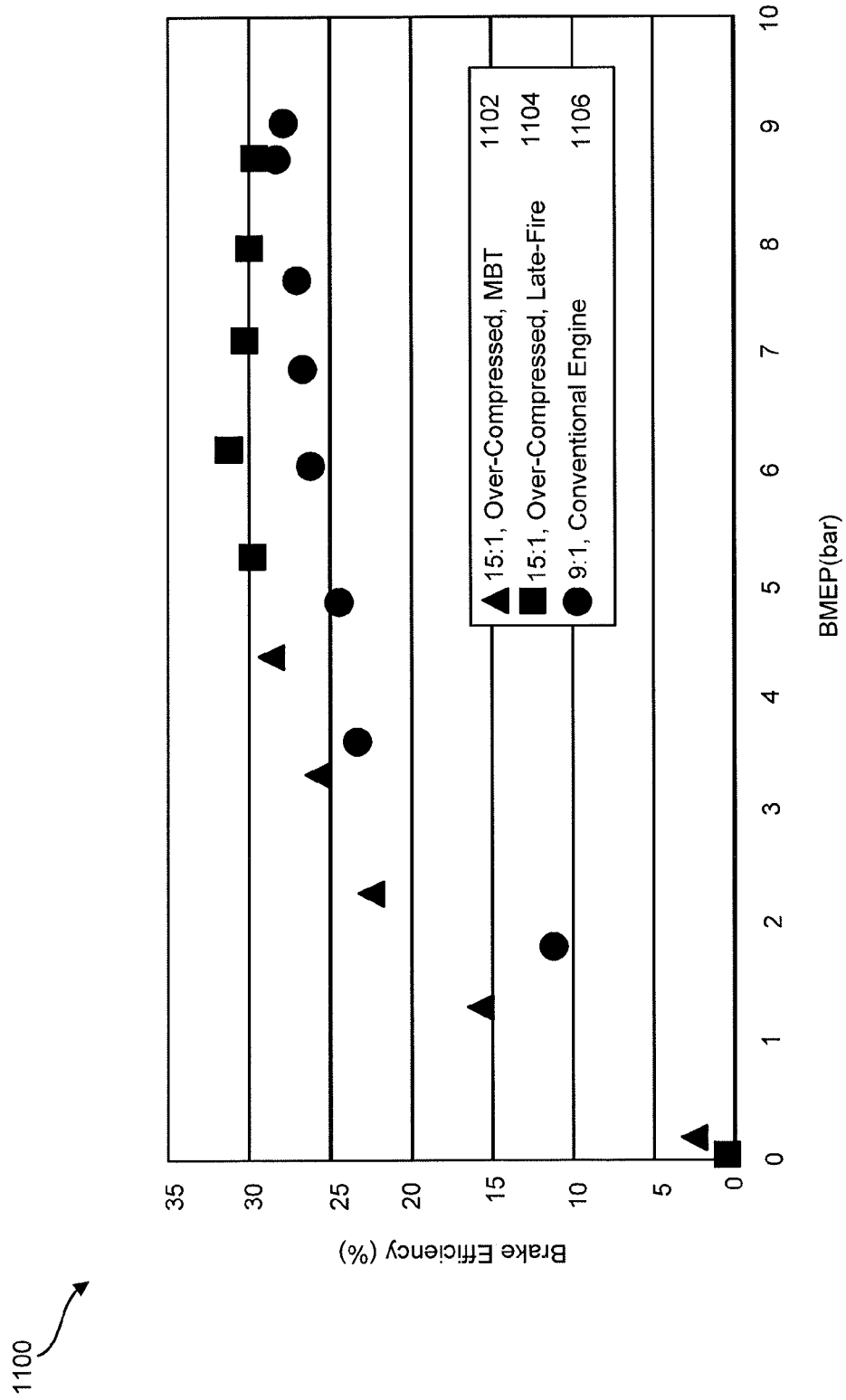
FIG. 11 is a charts comparing brake efficiency of an engine using features of the current subject matter at a compression ratio of 15:1 and a stoichiometric air/fuel ratio using variable spark timing to a conventional engine running at a compression ratio of 9:1 over a range of power outputs.
Figure 12:
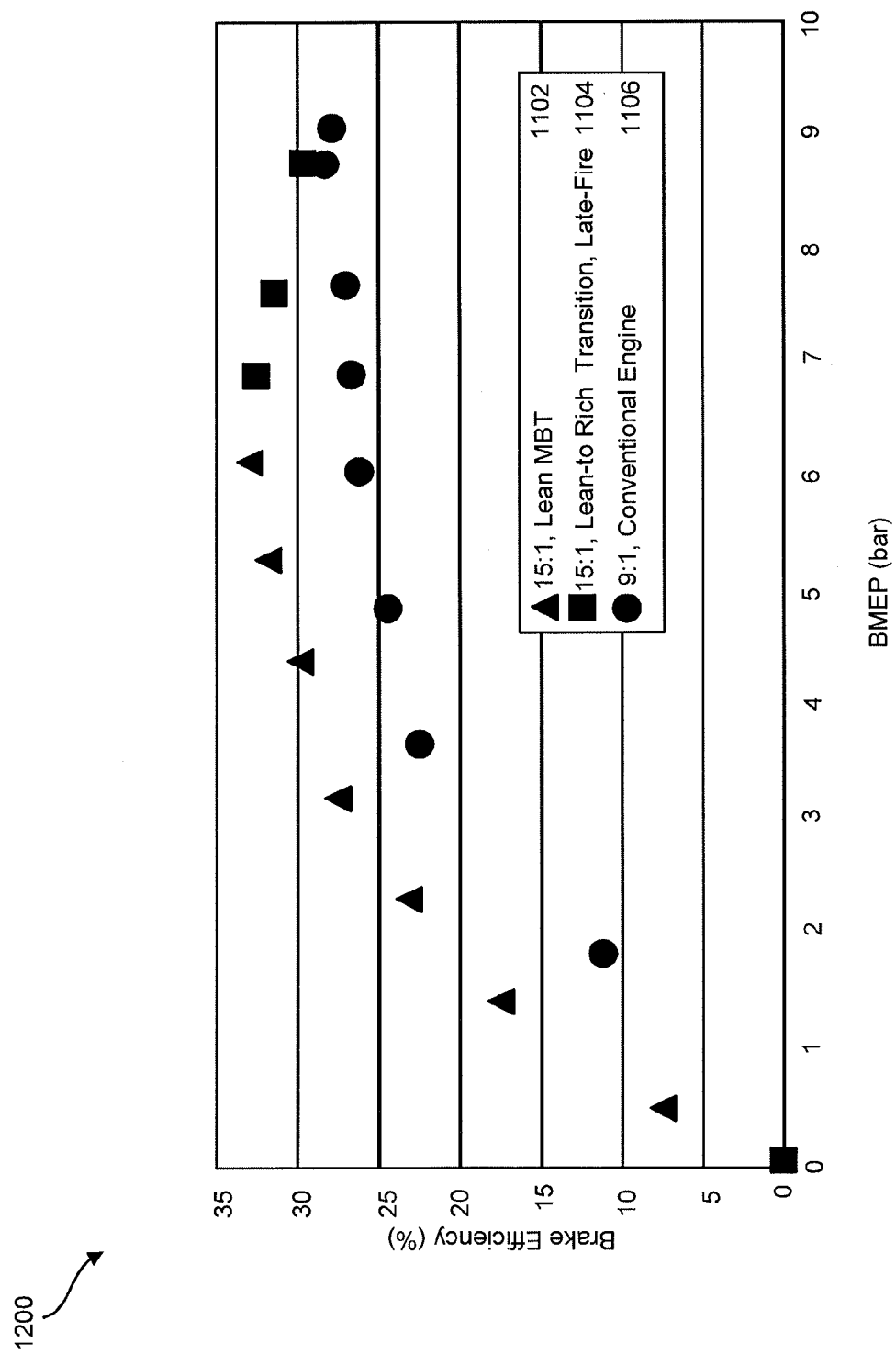
FIG. 12 is a chart comparing brake efficiency of an engine using features of the current subject matter at a compression ratio of 15:1 and a variable air/fuel ratio and variable spark timing to a conventional engine running at a compression ratio of 9:1 over a range of power outputs.

FIG. 11 and FIG. 12 show charts 1100 and 1200, respectively, that show comparisons of test cell data for a 173 cm³ displacement single cylinder single overhead camshaft engine with two valves per cylinder available from Bajaj Auto of Pune, Maharashtra, India. The test engine is one designed for use in an automotive rickshaw and having a compression ratio of 9:1. In comparison, a second engine having a 250 cm³ displacement opposed piston sleeve valve configuration similar to that shown in FIG. 3 and having a compression ratio of 15:1 was also tested. Both engines used 87 octane gasoline. In FIG. 11, the test data shown are for operation of both engines with a stoichiometric fuel to air mixture at 3000 revolutions per minute (RPM) at MBT without knock. The triangle data points 1102 reflect operation of the second engine in the efficiency mode as discussed herein. The square data points 1104 reflect operation of the second engine in the power mode, and the circle data points 1106 reflect operation of the convention engine across the same range of BMEP. A shown the second engine exhibits improved efficiency across the entire power range with the conventional engine approaching a comparable efficiency only at maximum power for both engines. In particular, in the BMEP range between approximately 2 and 6 bar, the second engine shows an efficiency improvement of 25% to 40% relative to the conventional engine. Current motor vehicles subjected to the U.S. Federal Test Procedure 75 (FTP-75) drive cycle consume the majority of fuel in the range of 0.5 to 3 BMEP while, for example, auto rickshaw vehicles in India consume the majority of fuel in the range of 2.5 to 5.5 BMEP during an Indian drive cycle (IDC). As such, FIG. 11 shows that at least some implementations of the current subject matter can provide dramatically improved fuel efficiency during low load conditions experienced under normal driving conditions.

FIG. 12 shows similar data in which the efficiency mode of the second engine includes a lean air/fuel ratio (i.e. λ greater than 1) with retarded timing as the power output increases and a transition to richer mixtures in the power mode. As the data in the chart 1200 show, the efficiency improvement over the conventional engine are equal to or greater than those shown in the chart 1100 for stoichiometric operation.

Table 1 provides data from a test cell for the second engine burning gasoline, the conventional Bajaj engine burning gasoline, the conventional Bajaj using a diesel engine burning diesel, the second engine burning natural gas, and the conventional Bajaj engine burning natural gas. An India drive cycle was simulated using a Gamma Technologies GT Drive matched to user results on a Bajaj 8.2 hp engine and dyno results. As shown in Table 1, the engine incorporating one or more features of an implementation of the current subject matter can exhibit increased fuel efficiency over both the Bajaj gasoline and Bajaj diesel engines. Similar results were obtained for the natural gas comparison, which can be important for countries, such as India, where CNG is a more common fuel.

TABLE 1

| Engine | mpg | km/L | km/kg | NOx (g/km) |
|---|---|---|---|---|
| Inventive Engine (gasoline) | 105 | 45 | — | .07 |
| Bajaj Engine (gasoline) | 84 | 36 | — | .67 |
| Bajaj Engine (diesel) | 94 | 40 | — | — |
| Inventive Engine (CNG) | — | — | 66 | — |
| Bajaj Engine (CNG) | — | — | 45 | — |

The implementations set forth in the foregoing description do not represent all implementations consistent with the subject matter described herein. Instead, they are merely some examples consistent with aspects related to the described subject matter. Additionally, the results depicted in FIGS. 10-12 and Table 1 are merely illustrative examples, and as such, the results can be obtained while remaining within the scope of the current subject matter.

Although a few variations have been described in detail herein, other modifications or additions are possible. In particular, further features and/or variations can be provided in addition to those set forth herein. For example, the implementations described above can be directed to various combinations and sub-combinations of the disclosed features and/or combinations and sub-combinations of one or more features further to those disclosed herein. In addition, the logic flows depicted in the accompanying figures and/or described herein do not necessarily require the particular order shown, or sequential order, to achieve desirable results. The scope of the following claims may include other implementations or embodiments.

What is claimed is:

1. A method comprising:
delivering, to a combustion volume of an internal combustion engine, a fluid comprising inlet air at or below a first target temperature, the delivering imparting sufficient motion to the fluid to generate at least a threshold amount of turbulence within the combustion volume, the combustion volume being defined by at least a cylinder wall and a piston;
maintaining, at or below a second target temperature, internal surfaces within the combustion volume that come into contact with a mixture of the inlet air and a fuel prior to completion of a burn of the mixture;
operating the internal combustion engine in an efficiency mode to provide a first power output range between zero and a transition power output level, the efficiency mode comprising use of a first spark ignition timing and a first air/fuel ratio of the mixture, the first spark ignition timing and the first air/fuel ratio of the mixture being selected to avoid premature auto-ignition of the mixture in the efficiency mode according to an octane rating of the fuel and a compression ratio exceeding approximately 13:1, and
operating the internal combustion engine in a power mode to provide a second power output range between the transition power output level and a maximum power output level, the power mode comprising use of a second spark ignition timing and a second air/fuel ratio of the mixture, the second spark ignition timing and the second air/fuel ratio being selected to avoid premature auto-ignition of the mixture in the power mode according to the octane rating of the fuel and the compression ratio exceeding approximately 13:1, wherein the efficiency mode comprises all throttle conditions of a throttle of the internal combustion engine including a wide open throttle (WOT) condition.

2. An internal combustion engine comprising:
an inlet port that delivers a fluid comprising inlet air to a combustion volume, the fluid being delivered with an imparted amount of motion that is sufficient to generate at least a threshold amount of turbulence within the combustion volume;
one or more internal surfaces of the combustion chamber that are maintained at or below a second target temperature, the one or more internal surfaces comprising a cylinder wall of a cylinder, a piston in the cylinder, and at least one valve associated with the inlet port or an exhaust port; and
one or more control devices that cause the internal combustion engine to be operated in:
an efficiency mode to provide a first power output range between zero and a transition power output level, the efficiency mode comprising use of a first spark ignition timing and a first air/fuel ratio of the mixture, the first spark ignition timing and the first air/fuel ratio of the mixture being selected to avoid premature auto-ignition of the mixture in the efficiency mode according to an octane rating of the fuel and a compression ratio exceeding approximately 13:1, and
a power mode to provide a second power output range between the transition power output level and a maximum power output level, the power mode comprising use of a second spark ignition timing and a second air/fuel ratio of the mixture, the second spark ignition timing and the second air/fuel ratio being selected to avoid premature auto-ignition of the mixture in the power mode according to the octane rating of the fuel and the compression ratio exceeding approximately 13:1, wherein the efficiency mode comprises all throttle conditions of a throttle of the internal combustion engine including a wide open throttle (WOT) condition.

3. An internal combustion engine as in claim 2, wherein the first air/fuel ratio is a first ratio ($\lambda_1$) of a first actual air/fuel ratio relative to a stoichiometric air/fuel ratio for the fuel that is approximately 1, and the second air/fuel ratio is a second ratio ($\lambda_2$) of a second actual air/fuel ratio relative to the stoichiometric air/fuel ratio for the fuel that is approximately 1.

4. An internal combustion engine as in claim 2, wherein the first spark ignition timing is at approximately maximum brake torque and the second spark ignition timing is gradually retarded to progressively later than maximum brake torque as the maximum power output is approached.

5. An internal combustion engine as in claim 2, wherein a peak pressure within the combustion volume is achieved and a 10% to 90% burn duration of the mixture occurs prior to before approximately 35° past a top dead center position of the piston.

6. An internal combustion engine as in claim 2, wherein the first air/fuel ratio is a first ratio ($\lambda_1$) of a first actual air/fuel ratio relative to a stoichiometric air/fuel ratio for the fuel that is progressively reduced from greater than approximately 1.3 as the transition power output level is approached, and the second air/fuel ratio is a second ratio ($\lambda_2$) of a second actual air/fuel ratio relative to the stoichiometric air/fuel ratio for the fuel that is approximately 1.

7. An internal combustion engine as in claim 2, wherein the first spark ignition timing is progressively retarded from approximately maximum brake torque as the transition power output level is approached.

8. An internal combustion engine as in claim 2, wherein a peak pressure within the combustion volume is achieved in a range of approximately 10° to 35° past a top dead center position of the piston and a 10% to 90% burn duration of the mixture occurs prior to approximately 35° past a top dead center position of the piston.

9. An internal combustion engine as in claim 2, wherein the octane rating is approximately 87 and the compression ratio is greater than approximately 14:1.

10. An internal combustion engine as in claim 2, wherein the compression ratio in the power mode is lower than the compression ratio in the efficiency mode.

11. An internal combustion engine as in claim 2, wherein the compression ratio in the power mode is approximately equal to the compression ratio in the efficiency mode.

12. An internal combustion engine as in claim 2, wherein the transition power output level occurs at approximately 70% of a brake mean effective pressure at the maximum power output level, or wherein the transition power output level occurs at approximately 60% of a brake mean effective pressure at the maximum power output level.

13. An internal combustion engine as in claim 2, further comprising an air intake that routes the inlet air to the inlet port via an air intake route comprising limited exposures to engine heat such that the inlet air remains at or below a first target temperature.

14. An internal combustion engine as in claim 2, wherein the inlet port comprises a duct to deliver the fluid to at least one of a sleeve valve and a poppet valve such that, when the at least one of the sleeve valve and the poppet valve is open to deliver the fluid to the combustion volume, the fluid acquires at least one of a swirling motion and a tumbling motion as it enters the combustion chamber.

15. An internal combustion engine as in claim 2, wherein the inlet port comprises a shroud configured to provide a tumbling motion of the delivered fluid in the combustion chamber.

16. An internal combustion engine as in claim 2, wherein a first portion of the piston and a cylinder head or a second piston are brought in close proximity during a compression stroke of the internal combustion engine while a second portion of the piston is not, such that the mixture is forced out of the close region into a larger volume within the combustion volume to induce turbulence in the larger volume.

17. An internal combustion engine as in claim 2, further comprising a cooling system that cools at least one valve associated with the inlet port or with an exhaust port to maintain the at least one valve below the second target temperature.

18. An internal combustion engine as in claim 2, wherein multiple spark ignition sites are provided within the combustion volume to shorten a duration of burn of the mixture.

19. An internal combustion engine as in claim 2, wherein the second target temperature is less than a piston crown temperature at operating conditions of the internal combustion engine.

20. A system comprising:
a processor that controls operation of an internal combustion engine, the processor performing operations comprising:
causing the internal combustion engine to operate in an efficiency mode to provide a first power output range between zero and a transition power output level, the efficiency mode comprising use of a first spark ignition timing and a first air/fuel ratio of the mixture, the first spark ignition timing and the first air/fuel ratio of the mixture being selected to avoid premature auto-ignition of the mixture in the efficiency mode according to an octane rating of the fuel and a compression ratio exceeding approximately 13:1,
detecting an engine pressure which exceeds the transition power output level; and
changing, in response to the detecting, at least one operating condition of the internal combustion engine to cause the internal combustion engine to operate in a power mode to provide a second power output range between the transition power output level and a maximum power output level, the power mode comprising use of a second spark ignition timing and a second air/fuel ratio of the mixture, the second spark ignition timing and the second air/fuel ratio being selected to avoid premature auto-ignition of the mixture in the power mode according to the octane rating of the fuel and the compression ratio exceeding approximately 13:1, wherein the efficiency mode comprises all throttle conditions of a throttle of the internal combustion engine including a wide open throttle (WOT) condition.

* * * * *